United States Patent
Shimizu et al.

(10) Patent No.: US 10,697,452 B2
(45) Date of Patent: Jun. 30, 2020

(54) OIL PRESSURE CONTROL DEVICE FOR VEHICLE AND OIL PRESSURE CONTROL METHOD FOR VEHICLE

(71) Applicant: JATCO Ltd, Fuji-shi, Shizuoka (JP)

(72) Inventors: Yutaka Shimizu, Atsugi (JP); Shusaku Katakura, Fujisawa (JP); Yusuke Ota, Ebina (JP); Youko Yoshioka, Kanagawa (JP); Yukiyoshi Inuta, Kanagawa (JP); Tomoyuki Koike, Kanagawa (JP)

(73) Assignee: JATCO LTD, Fuji-Shi (JP)

( * ) Notice: Subject to any disclaimer, the term of this patent is extended or adjusted under 35 U.S.C. 154(b) by 281 days.

(21) Appl. No.: 15/561,476

(22) PCT Filed: Mar. 9, 2016

(86) PCT No.: PCT/JP2016/057413
§ 371 (c)(1),
(2) Date: Sep. 25, 2017

(87) PCT Pub. No.: WO2016/152532
PCT Pub. Date: Sep. 29, 2016

(65) Prior Publication Data
US 2018/0100578 A1    Apr. 12, 2018

(30) Foreign Application Priority Data
Mar. 26, 2015  (JP) .................. 2015-065238

(51) Int. Cl.
*F04C 14/02* (2006.01)
*B60W 10/30* (2006.01)
(Continued)

(52) U.S. Cl.
CPC ............. *F04C 14/02* (2013.01); *B60W 10/30* (2013.01); *B60W 20/15* (2016.01); *F04B 49/06* (2013.01);
(Continued)

(58) Field of Classification Search
CPC ............. F16H 57/0434; F16H 61/0025; F04C 2240/40; F04C 2240/45; F04C 14/02; B60W 10/30
See application file for complete search history.

(56) References Cited

U.S. PATENT DOCUMENTS 9,683,573 B2 * 6/2017 Kagawa .................. F04B 49/06
2006/0120876 A1 * 6/2006 Kitano ..................... B60K 6/48
417/42

(Continued)

FOREIGN PATENT DOCUMENTS

JP    2007-002933 A    1/2007
JP    2012-097813 A    5/2012

*Primary Examiner* — Kenneth J Hansen
(74) *Attorney, Agent, or Firm* — Foley & Lardner LLP

(57) ABSTRACT

An oil pressure control device for a vehicle is configured such that, when switching from an oil pressure supply by means of a mechanical oil pump driven by a motor/generator to an oil pressure supply by means of an electric oil pump driven by a sub-motor, a supply ratio of oil supplied from the mechanical oil pump and a supply ratio of oil supplied from the electric oil pump, are adjusted based on an oil pressure difference between a first oil pressure and a second oil pressure, via first and second flapper valves. When the first oil pressure becomes less than or equal to a pump drive threshold, an increase in the second oil pressure is initiated, and the first oil pressure and the second oil pressure are made to match at a predetermined equilibrium oil pressure higher than a required line pressure.

7 Claims, 9 Drawing Sheets

(51) Int. Cl.
*F04B 49/06* (2006.01)
*B60W 20/15* (2016.01)
*F16H 61/00* (2006.01)
*F16H 61/662* (2006.01)
*F16H 63/50* (2006.01)
*B60W 10/08* (2006.01)

(52) U.S. Cl.
CPC ... *F16H 61/0031* (2013.01); *F16H 61/66272* (2013.01); *F16H 63/502* (2013.01); *B60W 10/08* (2013.01); *B60Y 2200/92* (2013.01); *F16H 2061/0037* (2013.01)

(56) References Cited

U.S. PATENT DOCUMENTS

2009/0112423 A1* 4/2009 Foster ................ F16H 61/0031
    701/60
2012/0302402 A1 11/2012 Waku et al.

\* cited by examiner

OIL PRESSURE CONTROL DEVICE FOR VEHICLE AND OIL PRESSURE CONTROL METHOD FOR VEHICLE

TECHNICAL FIELD

The present invention relates to an oil pressure control device and an oil pressure control method for a vehicle equipped with a first oil pump driven by a traveling driving source and a second oil pump driven by an electric motor.

BACKGROUND ART

Heretofore, an oil pressure control device for a vehicle equipped with a first oil pump driven by a traveling driving source, a second oil pump driven by an electric motor, a first flapper valve for preventing backflow of working oil to the first oil pump side, and a second flapper valve for preventing backflow of working oil to the second oil pump side, is generally known (for instance, see Patent document 1).

By the way, in the aforementioned conventional oil pressure control device for a vehicle, when switching an oil pressure source from the first oil pump to the second oil pump due to a decrease in the flow rate of oil discharged from the first oil pump, resulting from a rotational speed decrease of the traveling driving source, the supply ratio of discharge pressure supplied from the first oil pump and the supply ratio of discharge pressure supplied from the second oil pump are adjusted by means of first and second flapper valves. However, depending on an open/closed state of each of the first and second flapper valves during switching of the oil pressure source, a temporary drop in oil pressure supplied from the oil pressure source occurs and thus the oil pressure from the oil pressure source is likely to be less than a required line pressure.

It is, therefore, in view of the previously-described drawbacks of the prior art, an object of the invention to provide an oil pressure control device for a vehicle capable of preventing an oil pressure supplied from an oil pressure source from dropping below a required line pressure when switching from an oil pressure supply by means of the first oil pump to an oil pressure supply by means of the second oil pump.

CITATION LIST

Patent Literature

Patent document 1: Japanese Patent Provisional Publication No. JP2012-097813

SUMMARY OF INVENTION

In order to accomplish the aforementioned and other objects, an oil pressure control device for a vehicle according to the present invention is equipped with a first oil pump, a second oil pump, a ratio adjusting valve, and a second oil pump controller. The first oil pump is driven by a traveling driving source for an oil pressure supply. The second oil pump is driven by an electric motor separate from the traveling driving source for an oil pressure supply. The ratio adjusting valve is provided to adjust a supply ratio of oil supplied from the first oil pump and a supply ratio of oil supplied from the second oil pump, based on an oil pressure difference between a first oil pump discharge pressure and a second oil pump discharge pressure. The second oil pump controller is configured to set a predetermined oil pressure value higher than a required line pressure as an equilibrium oil pressure and set a predetermined oil pressure value higher than the equilibrium oil pressure as a pump drive threshold, when switching from the oil pressure supply by means of the first oil pump to the oil pressure supply by means of the second oil pump due to a decrease in the first oil pump discharge pressure. Furthermore, the second oil pump controller is configured to initiate an increase in the second oil pump discharge pressure by driving the second oil pump and permit the first oil pump discharge pressure and the second oil pump discharge pressure to be made to match at the equilibrium oil pressure, when the first oil pump discharge pressure becomes less than or equal to the pump drive threshold.

Effects of the Invention

Hereupon, when the first oil pump discharge pressure and the second oil pump discharge pressure have matched, the oil pressure difference between the first oil pump discharge pressure and the second oil pump discharge pressure becomes zero. Therefore, the ratio adjusting valve adjusts the supply ratio of oil supplied from the first oil pump and the supply ratio of oil supplied from the second oil pump, in a manner so as to equalize the supply ratio of oil supplied from the first oil pump with the supply ratio of oil supplied from the second oil pump. Thereafter, according to a decrease in the first oil pump discharge pressure the supply ratio of oil supplied from the first oil pump is decreased, while the supply ratio of oil supplied from the second oil pump is increased to supplement the decreased oil supply ratio. At this time, depending on a state of the ratio adjusting valve, a temporary decrease in oil pressure supplied from the oil pressure source may occur. In contrast, in the oil pressure control device for the vehicle according to the invention, when switching from the oil pressure supply by means of the first oil pump to the oil pressure supply by means of the second oil pump, an increase in the second oil pump discharge pressure is initiated immediately when the first oil pump discharge pressure becomes less than or equal to the pump drive threshold. Furthermore, the decreasing first oil pump discharge pressure and the increasing second oil pump discharge pressure are made to match at the predetermined equilibrium oil pressure higher than the required line pressure. Hence, even if a temporary drop in oil pressure supplied from the oil pressure source occurs, it is possible to secure the required line pressure. Also, an increase in the second oil pump discharge pressure is initiated at the timing when the first oil pump discharge pressure becomes less than or equal to the pump drive threshold. Hence, it is possible to increase the second oil pump discharge pressure up to the equilibrium oil pressure before the first oil pump discharge pressure decreases down to the equilibrium oil pressure. As a result of this, when switching from the oil pressure supply by means of the first oil pump to the oil pressure supply by means of the second oil pump, it is possible to prevent the oil pressure, which is supplied from the oil pressure source and serves as an original pressure of a line pressure, from dropping below the required line pressure.

DESCRIPTION OF EMBODIMENTS

The embodiments of an oil pressure control device for a vehicle according to the invention are hereinafter explained in detail with reference to the drawings showing the first, second and third embodiments, respectively.

First Embodiment

First of all, the system configuration of an oil pressure control device for a vehicle according to the first embodiment is explained, while classifying into "OVERALL SYSTEM CONFIGURATION OF HYBRID VEHICLE", "DETAILED CONFIGURATION OF OIL PRESSURE CONTROL CIRCUIT" and "PUMP SWITCHING CONTROL PROCESSING CONFIGURATION".

[Overall System Configuration of Hybrid Vehicle]

Figure 1:
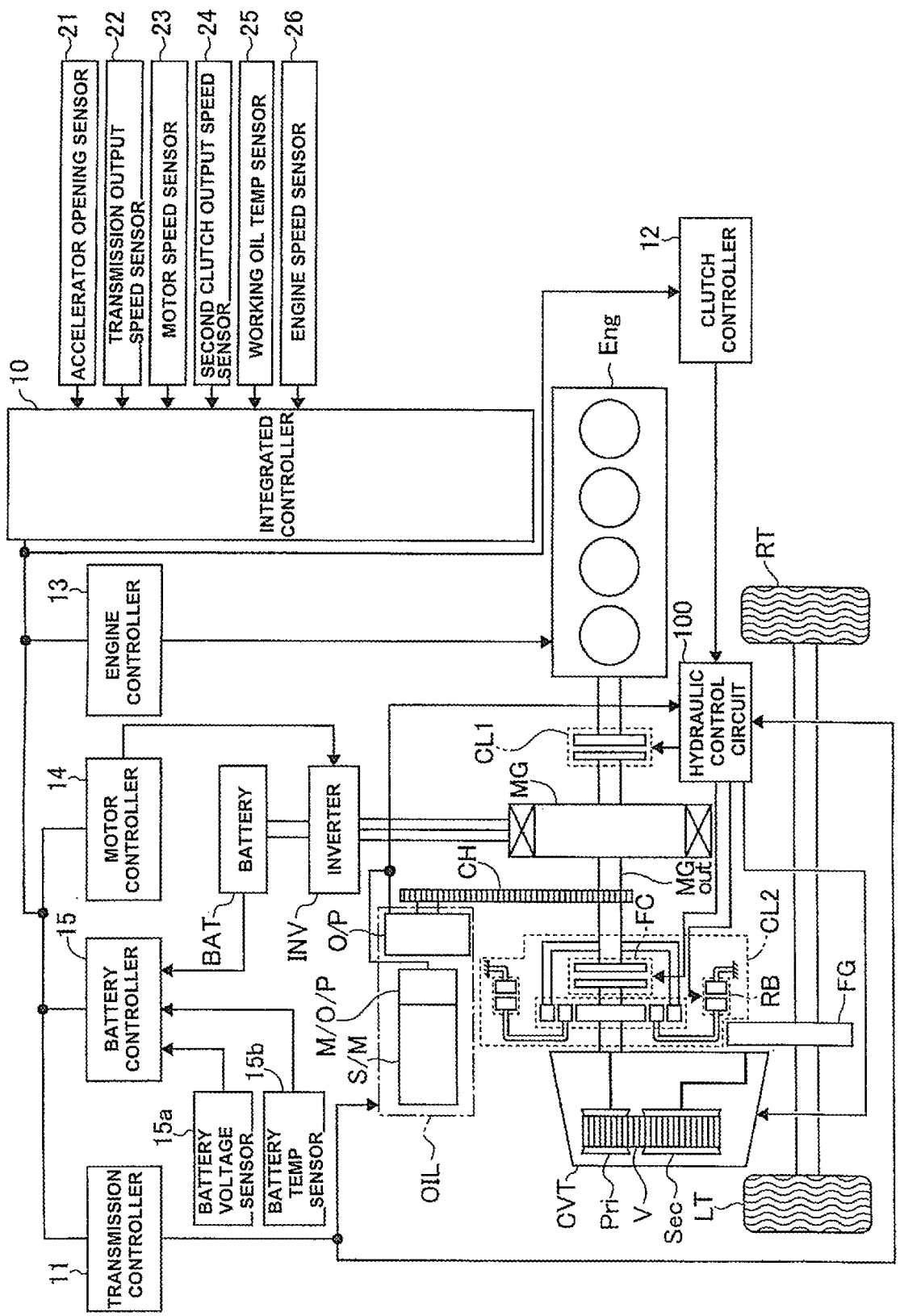
FIG. 1 is an overall system diagram illustrating a hybrid vehicle to which a control device of a first embodiment is applied.

Referring to FIG. 1, there is shown the overall system diagram illustrating the hybrid vehicle (a part of the vehicle) to which the control device of the first embodiment is applied. The overall system configuration of the hybrid vehicle of the first embodiment is hereunder described in reference to FIG. 1.

The oil pressure control device for the vehicle of the first embodiment is applied to the hybrid vehicle shown in FIG. 1. A drive system of the hybrid vehicle is provided with an engine Eng, a first clutch CL1, a motor/generator MG, a second clutch CL2, a continuously variable transmission CVT, a final gear FG, a left drive road wheel LT, and a right drive road wheel RT.

The engine Eng is able to operate in a lean combustion mode. The engine is controlled such that an engine torque is brought to a command value by intake air quantity control via a throttle actuator, fuel injection amount control via each individual injector, and ignition timing control via each individual ignition plug.

The first clutch CL1 is interposed between the engine Eng and the motor/generator MG. For instance, a dry clutch, which is normally opened by a biasing force of a diaphragm spring, is used as the first clutch CL1, for performing complete-engagement/half-engagement/release between the engine Eng and the motor/generator MG. With the first clutch CL1 placed in its complete-engagement state, a motor torque and an engine torque are both transmitted to the second clutch CL2. With the first clutch placed in its release state, only the motor torque is transmitted to the second clutch CL2. By the way, control for switching among complete-engagement, half-engagement, release is performed by stroke control made to a hydraulic actuator.

The motor/generator MG has an alternating-current synchronous motor structure. The motor/generator is configured to perform driving torque control and revolution speed control during starting or during traveling, and to perform recovery (energy regeneration) of vehicle kinetic energy, produced by regenerative braking control during braking or during decelerating, to a battery BAT.

The second clutch CL2 is a frictional engagement element interposed between the motor/generator MG and the left and right drive road wheels LT, RT. The second clutch CL2 is constructed by a hydraulically-operated wet multiple-disk friction clutch. Complete-engagement/slip-engagement/release of the second clutch is controlled by a second clutch oil pressure. In the first embodiment, a forward clutch FC and a reverse brake RB, which are provided in a forward/reverse (F/R) changeover mechanism of a planetary gear equipped continuously variable transmission CVT, are applied as the second clutch CL2. That is, during forward traveling, the forward clutch FC serves as the second clutch CL2. Conversely, during reverse traveling, the reverse brake RB serves as the second clutch CL2.

The continuously variable transmission CVT is a belt-type continuously variable transmission having a primary pulley Pri, a secondary pulley Sec, a pulley belt V wrapped around across the primary pulley Pri and the secondary pulley Sec. Primary pulley Pri and secondary pulley Sec are configured to vary respective pulley widths by hydraulic pressures supplied to the respective pulleys, while clamping and sandwiching the pulley belt V between them. That is to say, a transmission ratio (a pulley ratio) can be steplessly varied or freely controlled by varying the radii of camping surfaces of the pulleys, which clamp the pulley belt V.

Furthermore, an input gear of a mechanical oil pump O/P (a first oil pump) is connected through a chain CH to a motor output shaft MGout of motor/generator MG. The mechanical oil pump O/P is an oil pump, which is driven by a rotational driving force of the motor/generator MG for an oil pressure supply. For instance, a gear pump or a vane pump is used as the mechanical oil pump. Also, the mechanical oil pump O/P is structured to permit working oil to be discharged regardless of the rotation direction of motor/generator MG.

Provided as a further oil pressure source is an electric oil pump M/O/P (a second oil pump) driven by a rotational driving force of a sub-motor S/M (an electric motor) separate from the motor/generator MG for an oil pressure supply. The electric oil pump M/O/P has a three-phase alternating current motor structure, and structured to permit discharge flow rate control of working oil by revolution speed control.

Mechanical oil pump O/P and electric oil pump M/O/P serve as an oil pressure supply source OIL that creates or produces working oil pressures (control pressures) to be supplied to the first and second clutches CL1, CL2, and the continuously variable transmission CVT. In the oil pressure supply source OIL, when the discharge flow rate from mechanical oil pump O/P is sufficient, sub-motor S/M is stopped and thus electric oil pump M/O/P is stopped. Conversely when the discharge flow rate from mechanical oil pump O/P decreases, sub-motor S/M is driven and thus electric oil pump M/O/P is driven for delivering working oil from the electric oil pump M/O/P.

In this hybrid vehicle, one-motor and two-clutch drive system is constructed by the first clutch CL1, the motor/generator MG, and the second clutch CL2. This drive system has an "EV mode" and a "HEV mode" as main driving modes. The aforementioned "EV mode" is an electric vehicle mode in which the first clutch CL1 is released and the second clutch CL2 is engaged and thus only the motor/generator MG serves as the driving source. The aforementioned "HEV mode" is a hybrid vehicle mode in which the first and second clutches CL1, CL2 are both engaged, and thus the engine Eng and the motor/generator MG both serve as the driving source.

As shown in FIG. 1, the control system of the hybrid vehicle of the first embodiment is provided with an inverter INV, the battery BAT, an integrated controller 10, a transmission controller 11, a clutch controller 12, an engine controller 13, a motor controller 14, and a battery controller 15.

The inverter INV converts direct current (DC) into alternating current (AC) for producing a drive current for driving the motor/generator MG. The inverter also serves as a phase inverter in which a phase of the produced drive current is reversed for reversing output rotation of motor/generator MG.

The battery BAT is a secondary battery capable of reversibly charging and discharging. The battery serves to supply electricity (electric power) to the motor/generator MG and also serves to charge or store electricity (electric power) regenerated by the motor/generator MG.

The integrated controller 10 is configured to calculate a target driving torque corresponding to a driver's required driving force, based on a battery state (inputted from battery controller 15), an accelerator opening (detected by an accelerator opening sensor 21), and a vehicle speed (corresponding to a value synchronized with a transmission output revolution speed and detected by a transmission output revolution speed sensor 22). On the basis of the result of calculation of the target driving torque, the integrated controller also calculates command values to the respective actuators (motor/generator MG, engine Eng, the first clutch CL1, the second clutch CL2, and the continuously variable transmission CVT), and sends these command values to the respective controllers 11 to 15. The integrated controller 10 also serves as a second oil pump controller that performs drive control of electric oil pump M/O/P when switching from an oil pressure supply by means of the mechanical oil pump O/P to an oil pressure supply by means of the electric oil pump M/O/P.

The transmission controller 11 performs shift control in a manner so as to achieve a shift command from the integrated controller 10. The shift control is achieved by controlling an oil pressure to be supplied to each of a primary pulley Pri and a secondary pulley Sec, while using a line pressure PL supplied via a hydraulic control circuit 100 as an original pressure. Surplus pressure, produced when the respective oil pressures to be supplied to the primary pulley Pri and the secondary pulley Sec of continuously variable transmission CVT have been created based on the line pressure PL, serves to cool and/or lubricate the first clutch CL1 and the second clutch CL2.

The clutch controller 12 receives a second clutch input rotation speed (detected by a motor revolution speed sensor 23), a second cutch output revolution speed (detected by a second cutch output revolution speed sensor 24), and a clutch oil temperature (detected by a working oil temperature sensor 25). Also, the clutch controller 12 performs first clutch control and second clutch control in a manner so as to achieve a first clutch control command and a second clutch control command from the integrated controller 10. The first clutch control is achieved by controlling an oil pressure to be supplied to the first clutch CL1, while using the line pressure PL supplied via the hydraulic control circuit 100 as an original pressure. Also, the second clutch control is achieved by controlling an oil pressure to be supplied to the second clutch CL2, while using the line pressure PL supplied via the hydraulic control circuit 100 as an original pressure. Surplus pressure, produced when the respective oil pressures to be supplied to the first clutch CL1 and the second clutch CL2 have been created based on the line pressure PL, serves to cool and/or lubricate the first clutch CL1 and the second clutch CL2.

A circuit for supplying respective control oil pressures to the primary pulley Pri and the secondary pulley Sec of continuously variable transmission CVT and the second clutch CL2, while using the line pressure PL as an original pressure, is hereinafter referred to as "speed-change mechanism oil pressure system Sup". Also, a circuit for cooling and/or lubricating the second clutch CL2 is hereinafter referred to as "speed-change mechanism cooling/lubricating system Lub" (see FIG. 2).

The engine controller 13 receives an engine revolution speed (detected by an engine revolution speed sensor 26). The engine controller performs torque control of engine Eng in a manner so as to achieve an engine torque command value corresponding to a target engine torque from the integrated controller 10.

The motor controller 14 receives a motor revolution speed (detected by a motor revolution speed sensor 23). The motor controller performs control of motor/generator MG in a manner so as to achieve a motor torque command value and a motor revolution speed command value corresponding to a target motor torque from the integrated controller 10.

The battery controller 15 is configured to manage a state of charge (SOC) of battery BAT and send information about the battery's state of charge to the integrated controller 10. By the way, the state of charge of battery BAT can be calculated based on a source voltage detected by a battery voltage sensor 15a and a battery temperature detected by a battery temperature sensor 15b.

[Detailed Configuration of Oil Pressure Control Circuit]

Figure 2:
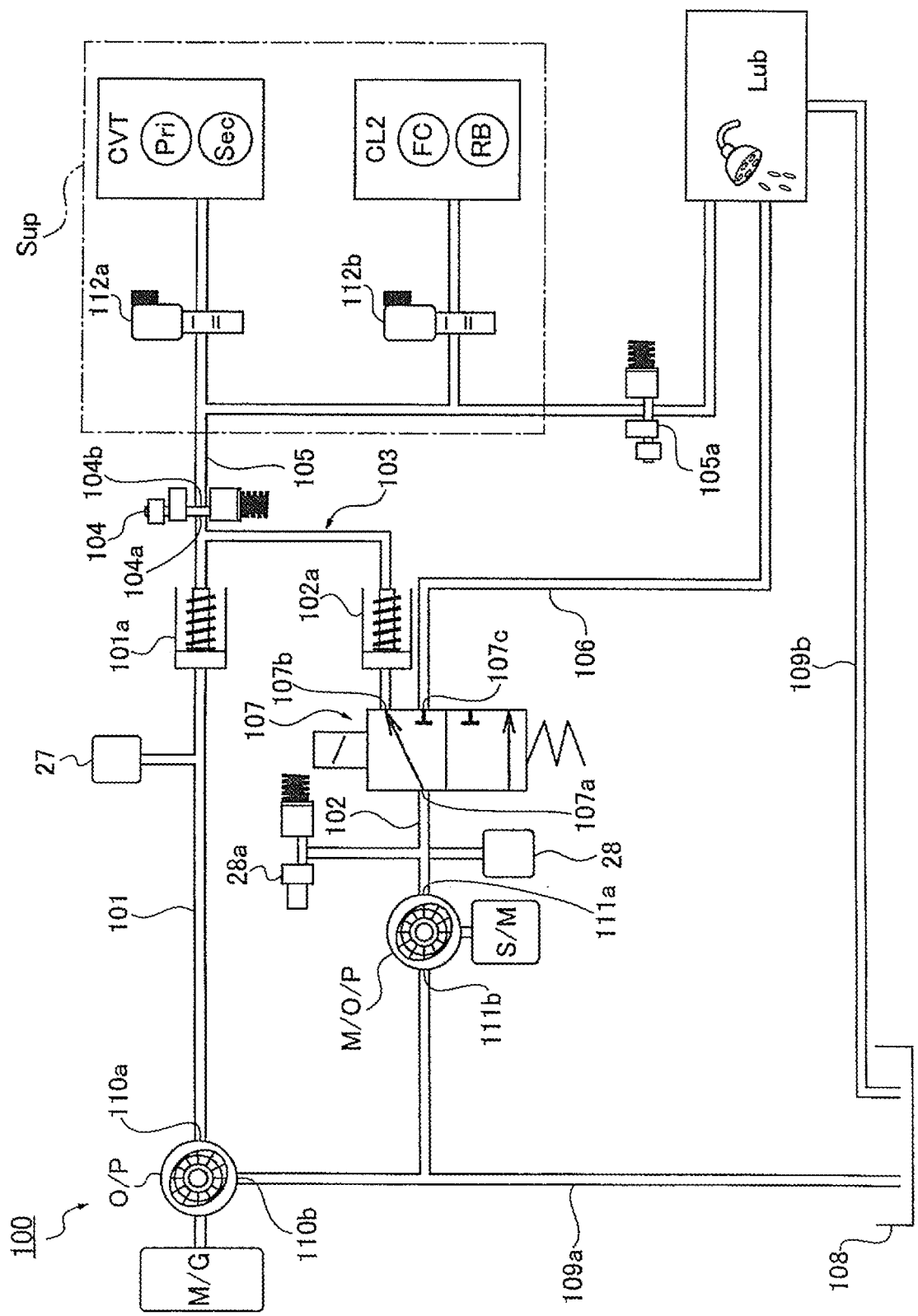
FIG. 2 is a hydraulic circuit diagram illustrating a hydraulic control circuit provided in the hybrid vehicle in the first embodiment.

Referring to FIG. 2, there is shown the hydraulic circuit diagram illustrating the hydraulic control circuit 100 provided in the hybrid vehicle in the first embodiment. The detailed configuration of the hydraulic control circuit 100 of the first embodiment is hereunder described in reference to FIG. 2.

The hydraulic control circuit 100 is configured to regulate or adjust the discharge pressure of the oil pressure supply source OIL comprised of mechanical oil pump O/P and electric oil pump M/O/P to the line pressure PL, and supply the regulated line pressure to the speed-change mechanism oil pressure system Sup. Also, hydraulic control circuit 100 is configured to supply surplus pressure, produced when the oil pressure supply to the speed-change mechanism oil pressure system Sup has been made, to the speed-change mechanism cooling/lubricating system Lub. Furthermore, hydraulic control circuit 100 is configured to supply working oil discharged from the electric oil pump M/O/P directly to the speed-change mechanism cooling/lubricating system Lub by switching between valve positions (flow paths) of a directional control valve 107. That is, as shown in FIG. 2, the hydraulic control circuit 100 of the first embodiment has the mechanical oil pump O/P, the electric oil pump M/O/P, a first oil passage 101, a first flapper valve 101a, a second oil passage 102, a second flapper valve 102a, a third oil passage 103, a line pressure regulating valve 104, a line pressure oil passage 105, a cooling system oil passage 106, and the directional control valve 107.

The mechanical oil pump O/P has a discharge port 110a and a suction port 110b. The first oil passage 101 is connected to the discharge port 110a, whereas a suction circuit 109a, which sucks working oil returned to an oil pan 108, is connected to the suction port 110b. The mechanical oil pump O/P is driven by rotationally driving the motor/generator MG, for sucking the working oil from the oil pan 108 through the suction circuit 109a and for discharging the working oil to the first oil passage 101. At this time, the discharge flow rate depends on a revolution speed of the motor/generator MG.

The electric oil pump M/O/P has a discharge port 111a and a suction port 111b. The second oil passage 102 is connected to the discharge port 111a, whereas the suction circuit 109a, which sucks working oil returned to the oil pan 108, is connected to the suction port 111b. The electric oil pump M/O/P is driven by rotationally driving the sub-motor S/M for sucking the working oil from the oil pan 108 through the suction circuit 109a and for discharging the working oil to the second oil passage 102. Hereupon, the discharge flow rate of electric oil pump M/O/P depends on a pump revolution speed of the electric oil pump. That is, a rate of flow of oil discharged from the electric oil pump M/O/P per one revolution of electric oil pump M/O/P is predetermined or preset, and the pump revolution speed has a proportional relationship with the pump discharge flow rate up to a given speed (a given flow rate).

The first oil passage 101 is connected at one end to the discharge port 110a of mechanical oil pump O/P. The first flapper valve 101a is provided at the other end of the first oil passage. The first oil passage 101 is an oil passage through which working oil discharged from the mechanical oil pump O/P flows. The oil pressure in the first oil passage 101 (hereinafter referred to as "first oil pressure P1") corresponds to an oil pressure supplied from the mechanical oil pump O/P (i.e., a first oil pump discharge pressure). The first oil passage 101 communicates with the third oil passage 103, when the first flapper valve 101a opens. Also, a first pressure sensor 27, which detects the first oil pressure P1, is located in the first oil passage 101, for monitoring the first oil pressure P1.

The second oil passage 102 is connected at one end to the discharge port 111a of electric oil pump M/O/P. The second flapper valve 102a is provided at the other end of the second oil passage. The second oil passage 102 is an oil passage through which working oil discharged from the electric oil pump M/O/P flows. The oil pressure in the second oil passage 102 (hereinafter referred to as "second oil pressure P2") corresponds to an oil pressure supplied from the electric oil pump M/O/P (i.e., a second oil pump discharge pressure). The second oil passage 102 communicates with the third oil passage 103, when the second flapper valve 102a opens. The directional control valve 107 is installed at a middle position of the second oil passage 102. That is, the second oil passage 102 is, at its middle position, cut or divided into two sections, namely, one being connected to a directional-control-valve input port 107a of directional control valve 107 and the other being connected to a directional-control-valve output port 107b of directional control valve 107. Also, a second pressure sensor 28, which detects the second oil pressure P2, and a pressure leak valve 28a are both located in the second oil passage 102. When the second oil pressure P2, which is monitored by the second pressure sensor 28, reaches a predetermined relief pressure $P_{re}$, the pressure leak valve 28a opens, thereby draining the working oil in the second oil passage 102.

The first flapper valve 101a is a valve for preventing backflow of working oil to the side of mechanical oil pump O/P. The first flapper valve has a characteristic that opens when the first oil pressure P1 becomes higher than the oil pressure in the third oil passage 103 (hereinafter referred to as "third oil pressure P3"). Also, the second flapper valve 102a is a valve for preventing backflow of working oil to the side of electric oil pump M/O/P. The second flapper valve has a characteristic that opens when the second oil pressure P2 becomes higher than the third oil pressure P3. By the way, the magnitude of the third oil pressure P3 is determined as a higher oil pressure of the first oil pressure P1 and the second oil pressure P2. That is, one of the first flapper valve 101a and the second flapper valve 102a, which corresponds to a higher oil pressure of the first oil pressure P1 and the second oil pressure P2, opens, while the other of the first and second flapper valves is closed. Hereby, the third oil pressure P3 has the same magnitude as the oil pressure corresponding to the flapper valve that opens.

By the way, when there is no oil pressure difference between the first oil pressure P1 and the second oil pressure P2, the first and second flapper valves 101a, 102a both open. Conversely when changing from a zero oil pressure difference state to a state where either one of the first oil pressure P1 and the second oil pressure P2 becomes higher, on the basis of the oil pressure difference, the valve opening of one of the flapper valves corresponding to the higher oil pressure increases, while the other flapper valve opening gradually decreases or narrows. That is to say, the first and second flapper valves 101a, 102a correspond to a ratio adjusting valve for adjusting a supply ratio of oil supplied from the mechanical oil pump O/P and a supply ratio of oil supplied from the electric oil pump M/O/P, on the basis of an oil pressure difference between the first oil pressure P1 and the second oil pressure P2.

One end of the third oil passage 103 is branched into two sections, namely, one being connected to the first flapper valve 101a, and the other being connected to the second flapper valve 102a, thus permitting working oil from the first oil passage 101 and working oil from the second oil passage 102 to be flown into the third oil passage. The other end of the third oil passage 103 is connected to an input port 104a of line pressure regulating valve 104. That is, the third oil passage 103 is an oil passage through which working oil discharged from the oil pressure supply source OIL (mechanical oil pump O/P and/or electric oil pump M/O/P)

flows. The third oil pressure P3 corresponding to the oil pressure in the third oil passage 103 serves as an original pressure of line pressure PL.

The line pressure regulating valve 104 is a pressure adjusting valve that creates or produces the line pressure PL to be supplied to the speed-change mechanism oil pressure system Sup by regulating the third oil pressure P3. That is, the line pressure regulating valve 104 has an input port 104a and an output port 104b. The third oil passage 103 is connected to the input port, whereas the line pressure oil passage 105, which communicates with the speed-change mechanism oil pressure system Sup, is connected to the output port. Working oil in the third oil passage 103 is escaped or directed to a drain circuit (not shown) by movement of a spool of the line pressure regulating valve 104 responsively to an instruction value (a command value) from the integrated controller 10, thereby regulating the line pressure PL. Also, a pressure adjusting valve 105a is provided in the line pressure oil passage 105, for escaping surplus pressure, which is obtained by subtracting an oil pressure required for the speed-change mechanism oil pressure system Sup from the line pressure PL, to the speed-change mechanism cooling/lubricating system Lub.

One end of cooling system oil passage 106 is connected to a cooling system side port 107c of directional control valve 107, while the other end communicates with the speed-change mechanism cooling/lubricating system Lub, for supplying working oil discharged from the electric oil pump M/O/P to the speed-change mechanism cooling/lubricating system Lub, when the directional control valve 107 has been switched to a cooling mode. By the way, the working oil, which has been used for cooling/lubricating within the speed-change mechanism cooling/lubricating system Lub, is returned through a drain circuit 109b to the oil pan 108.

The directional control valve 107 is installed in the second oil passage 102. The directional control valve is configured to supply working oil discharged from the electric oil pump M/O/P to the third oil passage 103 or to supply working oil discharged from the electric oil pump M/O/P to the speed-change mechanism cooling/lubricating system Lub, depending on a switching signal from the integrated controller 10. That is, the directional control valve 107 has an ON/OFF solenoid and a directional control valve member. When the directional-control-valve input port 107a is brought into fluid-communication with the directional-control-valve output port 107b, the second oil passage 102 is placed into its fully communicated state. Conversely when the directional-control-valve input port 107a is brought into fluid-communication with the cooling system side port 107c, the path of flow through the second oil passage 102 is switched to the speed-change mechanism cooling/lubricating system Lub.

The speed-change mechanism oil pressure system Sup has a pressure regulating valve 112a for the transmission, which is provided in the line pressure oil passage 105, and a pressure regulating valve 112b for the second clutch, which is provided in the line pressure oil passage 105. Through the use of the pressure regulating valve 112a for the transmission, oil pressures to be supplied to the primary pulley Pri and the secondary pulley Sec are regulated, while using the line pressure PL as an original pressure. Then, the regulated oil pressures are supplied to the primary pulley Pri and the secondary pulley Sec. Through the use of the pressure regulating valve 112b for the second clutch, oil pressures to be supplied to the forward clutch FC and the reverse brake RB are regulated, while using the line pressure PL as an original pressure. Then, the regulated oil pressures are supplied to the forward clutch FC and the reverse brake RB.

[Pump Switching Control Processing Configuration]

Figure 3:
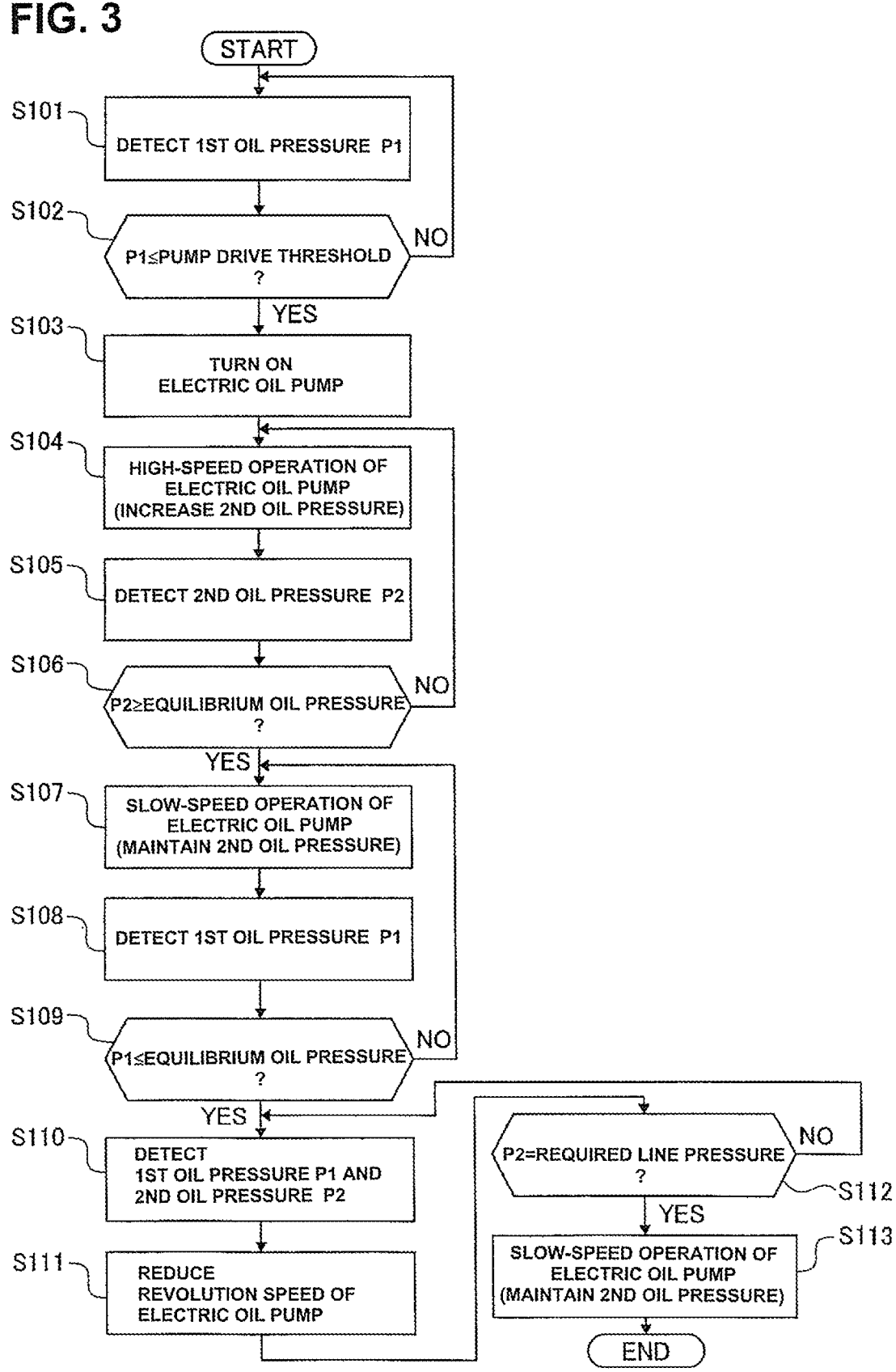
FIG. 3 is a flowchart illustrating a flow of pump switching control processing executed within an integrated controller in the first embodiment.

Referring to FIG. 3, there is shown the flowchart illustrating the flow of pump switching control processing executed within the integrated controller 10 in the first embodiment. Respective steps of FIG. 3 showing the pump switching control processing configuration of the first embodiment are hereunder explained. By the way, the pump switching control processing is initiated when the accelerator is brought into an OFF (released) condition under a state where, during traveling, the revolution speed of mechanical oil pump O/P is sufficiently high, and as a result the revolution speed of motor/generator MG reduces, the vehicle speed decreases, and further the revolution speed of mechanical oil pump O/P reduces. That is, the pump switching control processing is initiated or triggered by a transition of the accelerator to its OFF condition during traveling.

At step S101, the first oil pressure P1 is detected, and then the routine proceeds to step S102. Hereupon, the first oil pressure P1 is detected by means of the first pressure sensor 27.

Subsequently to the detection of the first oil pressure P1 at step S101, at step S102 a check is made to determine whether the detected first oil pressure P1 is less than or equal to a preset pump drive threshold $P_{O/P}$. When the answer to this step is YES (i.e., P1≤pump drive threshold $P_{O/P}$), a determination is made that a required line pressure $PL_{ne}$ cannot be provided by only the working oil from the mechanical oil pump O/P, and then the routine proceeds to step S103. Conversely when the answer to this step is NO (i.e., P1>pump drive threshold $P_{O/P}$), a determination is made that the required line pressure $PL_{ne}$ can be provided by only the working oil from the mechanical oil pump O/P, and then the routine returns back to step S101. By the way, the previously-discussed "pump drive threshold $P_{O/P}$" is an oil pressure value higher than the required line pressure $PL_{ne}$ and also higher than an equilibrium oil pressure $P_{ba}$ (described later). The "pump drive threshold $P_{O/P}$" is set as a value higher than the first oil pressure P1 at a point of time going back by a required time length from a time when the driving of electric oil pump M/O/P is initiated to a time when the second oil pressure P2 reaches the equilibrium oil pressure $P_{ba}$, from a timing at which the decreasing first oil pressure P1 becomes the equilibrium oil pressure $P_{ba}$. Also, the "required line pressure $PL_{ne}$" is a minimum required oil pressure required for the speed-change mechanism oil pressure system Sup and the speed-change mechanism cooling/lubricating system Lub to which oil pressures are supplied from the oil pressure supply source OIL. The minimum required oil pressure for the primary pulley Pri and the secondary pulley Sec is an oil pressure at which the primary pulley Pri and the secondary pulley Sec do not slip. Also, the minimum required oil pressure for the second clutch CL2 is an oil pressure at which the engaged forward clutch FC and the engaged (applied) reverse brake RB do not slip. Also, the minimum required oil pressure for the speed-change mechanism cooling/lubricating system Lub is an oil pressure required to appropriately cool and/or lubricate the second clutch CL2. In the embodiment, the highest one of the minimum required oil pressures for respective parts that require oil pressure is set as the "required line pressure $PL_{ne}$". By the way, a value, which is obtained by adding a margin (a correction value) for oil pressure fluctuations to the minimum required oil pressure, may be set as the "required line pressure $PL_{ne}$".

Subsequently to the determination of P1≤pump drive threshold $P_{O/P}$ at step S102, at step S103 the driving of electric oil pump M/O/P is initiated by operating the sub-motor S/M, and then the routine proceeds to step S104.

Subsequently to the initiation of driving of electric oil pump M/O/P at step S103, at step S104 the electric oil pump M/O/P is placed into a high-speed mode of operation, and then the routine proceeds to step S105. At this time, owing to the second flapper valve 102a closed, the working oil discharged from the electric oil pump M/O/P is stored or retained stagnant in the second oil passage 102 and thus the second oil pressure P2 increases.

Subsequently to the high-speed operation of electric oil pump M/O/P (i.e., the increase in the second oil pressure P2) at step S104, at step S105 the second oil pressure P2 is detected, and then the routine proceeds to step S106. Hereupon, the second oil pressure P2 is detected by means of the second pressure sensor 28.

Subsequently to the detection of the second oil pressure P2 at step S105, at step S106 a check is made to determine whether the detected second oil pressure P2 is greater than or equal to the equilibrium oil pressure $P_{ba}$. When the answer to this step is YES (i.e., P2≥equilibrium oil pressure $P_{ba}$), a determination is made that the second oil pressure P2 has reached its target pressure, and then the routine proceeds to step S107. Conversely when the answer to this step is NO (i.e., P2<equilibrium oil pressure $P_{ba}$), a determination is made that the second oil pressure P2 has not yet reached its target pressure, and then the routine returns to step S104. By the way, the previously-discussed "equilibrium oil pressure $P_{ba}$" is an oil pressure value higher than the required line pressure $PL_{ne}$. The equilibrium oil pressure $P_{ba}$ is set as a value obtained by adding a correction value (obtained by experiments or the like) for oil pressure fluctuations, occurring when the first oil pressure P1 and the second oil pressure P2 have matched, to the required line pressure $PL_{ne}$.

Subsequently to the determination of P2≥equilibrium oil pressure $P_{ba}$ at step S106, at step S107 the output of sub-motor S/M is decreased such that the electric oil pump M/O/P is placed into a slow-speed mode of operation, and then the routine proceeds to step S108. At this time, the second oil pressure P2 is maintained or kept at the equilibrium oil pressure $P_{ba}$ by controlling the discharge flow rate of electric oil pump M/O/P in such a manner as to balance with the second oil pressure P2.

Subsequently to the slow-speed operation of electric oil pump M/O/P (i.e., the keeping of the second oil pressure P2) at step S107, at step S108 the first oil pressure P1 is detected, and then the routine proceeds to step S109.

Subsequently to the detection of the first oil pressure P1 at step S108, at step S109 a check is made to determine whether the detected first oil pressure P1 is less than or equal to the equilibrium oil pressure $P_{ba}$. When the answer to this step is YES (i.e., P1≤equilibrium oil pressure $P_{ba}$), a determination is made that the first oil pressure P1 and the second oil pressure P2 have matched, and then the routine proceeds to step S110. Conversely when the answer to this step is NO (i.e., P1>equilibrium oil pressure $P_{ba}$), a determination is made that the first oil pressure P1 and the second oil pressure P2 have not yet matched, and then the routine returns to step S107.

Subsequently to the determination of P1≤equilibrium oil pressure $P_{ba}$ at step S109, at step S110 the first oil pressure P1 and the second oil pressure P2 are detected respectively, and then the routine proceeds to step S111.

Subsequently to the detection of the first and second oil pressures P1, P2 at step S110, at step S111 the output of sub-motor S/M is decreased such that the revolution speed of electric oil pump M/O/P reduces and thus a gradual decrease in the second oil pressure P2 is produced, and then the routine proceeds to step S112. At this time, the revolution speed of electric oil pump M/O/P is controlled in such a manner that the second oil pressure P2 decreases under a specific condition that allows a given margin taking fluctuations of the second oil pressure P2 into account, in comparison with a decrease in the first oil pressure P1. That is, the electric oil pump revolution speed is controlled such that the second oil pressure P2 becomes kept higher than the first oil pressure P1 by the given margin.

Subsequently to the reduction in revolution speed of electric oil pump M/O/P at step S111, at step S112 a check is made to determine whether the second oil pressure P2 reaches the required line pressure $PL_{ne}$. When the answer to this step is YES (i.e., P2=required line pressure $PL_{ne}$), the routine proceeds to step S113. Conversely when the answer to this step is NO (i.e., P2>required line pressure $PL_{ne}$), the routine returns to step S110.

Subsequently to the determination of P2=required line pressure $PL_{ne}$ at step S112, at step S113 the output of sub-motor S/M is decreased such that the electric oil pump M/O/P is placed into a slow-speed mode of operation, and then this routine ends. At this time, the second oil pressure P2 is maintained or kept at the required line pressure $PL_{ne}$ by controlling the discharge flow rate of electric oil pump M/O/P in such a manner as to balance with the required line pressure $PL_{ne}$.

Next, the operation is explained. First of all, the configuration and task of the oil pressure control device for the vehicle of the comparative example are explained. Subsequently, the operation of the oil pressure control device for the vehicle of the first embodiment is explained, while classifying into "REQUIRED PRESSURE SECURING OPERATION WHEN SWITCHING OIL PRESSURE SOURCE" and "OTHER CHARACTERISTIC OPERATIONS".

[Configuration and Task of Oil Pressure Control Device for Vehicle of Comparative Example]

Figure 4:
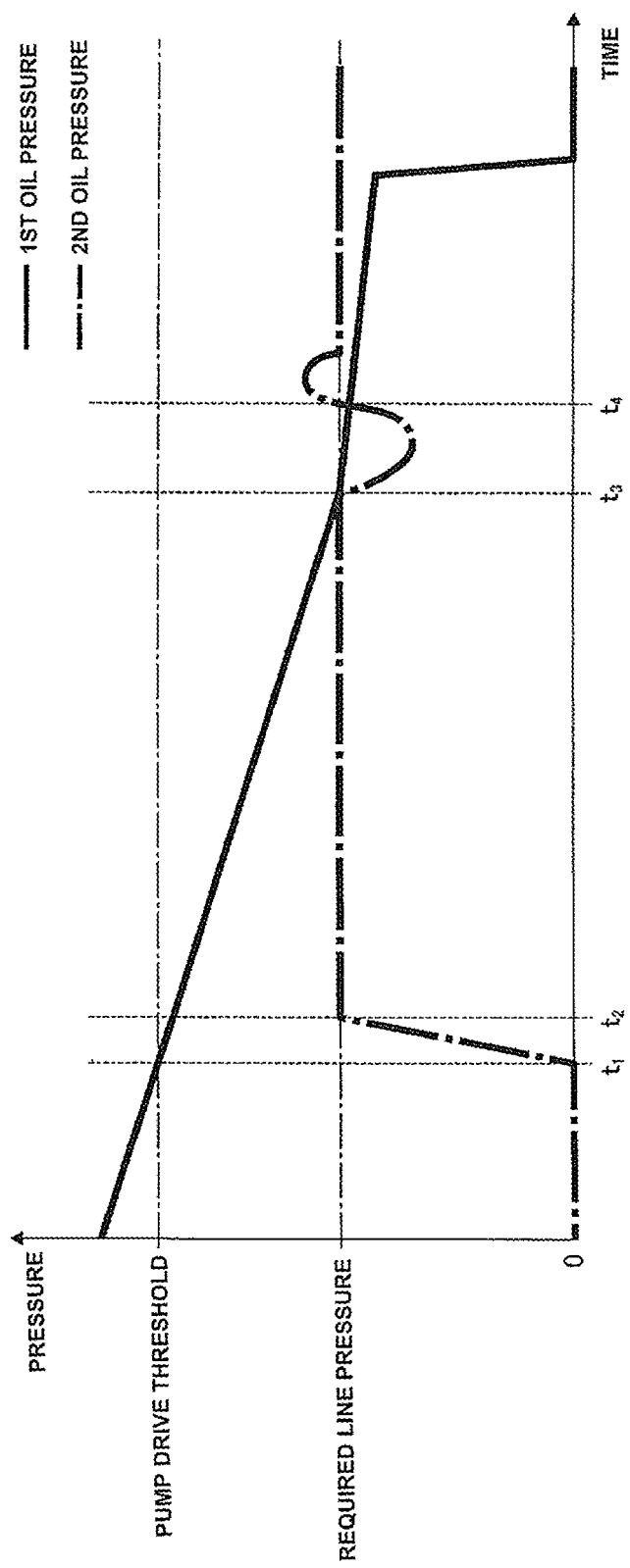
FIG. 4 is a time chart illustrating respective characteristics of a first oil pressure and a second oil pressure, when switching an oil pressure source from a mechanical oil pump to an electric oil pump in a control device of a comparative example.

Referring to FIG. 4, there is shown the time chart illustrating respective characteristics of the first oil pressure and the second oil pressure when switching the oil pressure source from the mechanical oil pump to the electric oil pump in the control device of the comparative example. The configuration and task of the oil pressure control device for the vehicle of the comparative example are hereunder explained in reference to FIG. 4.

In a vehicle equipped with a mechanical oil pump driven by a traveling driving source such as an engine, a driving motor or the like for an oil pressure supply, and an electric oil pump driven by an electric motor separate from the traveling driving source for an oil pressure supply, when the revolution speed of the traveling driving source reduces owing to a vehicle speed decrease or the like, the discharge flow rate of the mechanical oil pump decreases. Hereby, the discharge pressure (the first oil pressure P1) of the mechanical oil pump also decreases. Accordingly, it is necessary to secure a required line pressure by virtue of the discharge pressure (the second oil pressure P2) of the electric oil pump by driving the electric oil pump.

In the case of the control device of the comparative example, as seen in the time chart of FIG. 4, prior to the time $t_1$ an accelerator release has already been made and thus the revolution speed of the traveling driving source reduces.

Consequently, the discharge flow rate of the mechanical oil pump decreases and thus a decrease in the first oil pressure P1 occurs. Then, at the time $t_1$ when the first oil pressure P1 becomes less than or equal to the predetermined pump drive threshold, the driving of the electric oil pump is initiated, and thus the second oil pressure P2 is built up.

The first flapper valve is provided in the first oil passage through which working oil discharged from the mechanical oil pump flows, whereas the second flapper valve is provided in the second oil passage through which working oil discharged from the electric oil pump flows. The supply ratio of oil supplied from the first oil pump and the supply ratio of oil supplied from the second oil pump are adjusted based on the oil pressure difference between the oil pressure in the first oil passage (the first oil pressure P1) and the oil pressure in the second oil passage (the second oil pressure P2) by means of the first and second flapper valves.

That is, at the time $t_1$, a buildup of the second oil pressure P2 starts to develop, and thus the first oil pressure P1 becomes greater than the second oil pressure P2 (P1>P2). Hence, only the first flapper valve is kept open, while the second flapper valve remains closed. At this time, there is no supply of the second oil pressure P2, and thus the oil pressure (the third oil pressure) supplied to the line pressure regulating valve is determined by the first oil pressure P1.

Then, at the time $t_2$ when the second oil pressure P2 reaches the required line pressure $PL_{ne}$, the electric oil pump is placed into a slow-speed mode of operation, such that the second oil pressure P2 is maintained at the required line pressure $PL_{ne}$. That is, the second oil pressure P2 is controlled to stand by at the required line pressure $PL_{ne}$ serving as a standby pressure, while waiting for the first oil pressure P1 to decrease down to the required line pressure. At this time, the first flapper valve is continuously kept in its open state, while the second flapper valve becomes placed into a slightly open state when the second oil pressure P2 exceeds the required line pressure $PL_{ne}$. However, while the second oil pressure P2 is maintained at the required line pressure, the first oil pressure P1 is still greater than the second oil pressure P2 (P1>P2). Hence, the oil pressure (the third oil pressure) supplied to the line pressure regulating valve is determined by the first oil pressure P1.

At the time $t_3$ when the first oil pressure P1 reaches the required line pressure $PL_{ne}$, the first oil pressure P1 becomes equal to the second oil pressure P2 (P1=P2), because of the second oil pressure P2 maintained at the required line pressure $PL_{ne}$. Thus, the first and second flapper valves both open. At this time, the second flapper valve, which has been kept in a slightly open state, opens at a stroke, and thus a temporary decrease in the second oil pressure P2 occurs. Owing to the temporary decrease in the second oil pressure P2, at the time $t_3$ the second flapper valve becomes closed again and thus only the first flapper valve becomes kept open. However, the first oil pressure P1 continues decreasing. Therefore, a state where the oil pressure (the third oil pressure) supplied to the line pressure regulating valve is less than the required line pressure $PL_{ne}$ continues, and as a result a temporary drop in line pressure PL tends to occur. Owing to the line pressure PL dropped, there is a possibility that a power transmission member, for example the clutch and/or the pulley, undesirably slips.

In order to increase the oil pressure (the third oil pressure) supplied to the line pressure regulating valve, the second oil pressure P2 has to be recovered by increasing the flow rate of the electric oil pump. On the other hand, the first oil pressure P1 still continues decreasing. Therefore, at the time $t_4$, the first oil pressure P1 becomes equal to the second oil pressure P2 (P1=P2). Hence, the first and second flapper valves both open again. However, at this time, the second oil pressure P2 undesirably exceeds the required line pressure $PL_{ne}$ because of the increased flow rate of the electric oil pump. Then, the first flapper valve becomes closed, whereas the second flapper valve remains open. Hereby, the oil pressure (the third oil pressure) supplied to the line pressure regulating valve is determined by the second oil pressure P2. By the way, even if the oil pressure (the third oil pressure) supplied to the line pressure regulating valve exceeds the required line pressure $PL_{ne}$, any problem does not occur in the line pressure PL by virtue of the line pressure regulating valve through which the working fluid can be appropriately drained.

Thereafter, the flow rate of the electric oil pump is controlled such that the second oil pressure P2, which determines the oil pressure (the third oil pressure) supplied to the line pressure regulating valve, is maintained at the required line pressure $PL_{ne}$. On the other hand, the mechanical oil pump is still rotating by friction torque, and additionally a relief valve is not provided in the first oil passage. Accordingly, with the first flapper valve closed, the first oil pressure P1 increases, and thus the first flapper valve becomes placed into a slightly open state. That is, the first flapper valve is maintained at the slightly open state until the mechanical oil pump has stopped rotating.

In this manner, in the case of the control device of the comparative example, when switching the oil pressure source from the mechanical oil pump to the electric oil pump, the second oil pressure P2 is controlled to stand by at the required line pressure $PL_{ne}$. Therefore, depending on the states of the first and second flapper valves, there is a possibility that the oil pressure (the third oil pressure) supplied to the line pressure regulating valve drops below the required line pressure $PL_{ne}$ and thus a temporary drop in line pressure PL occurs. Hereby, there is a possibility that a power transmission member undesirably slips.

[Required Pressure Securing Operation When Switching Oil Pressure Source]

Figure 5:
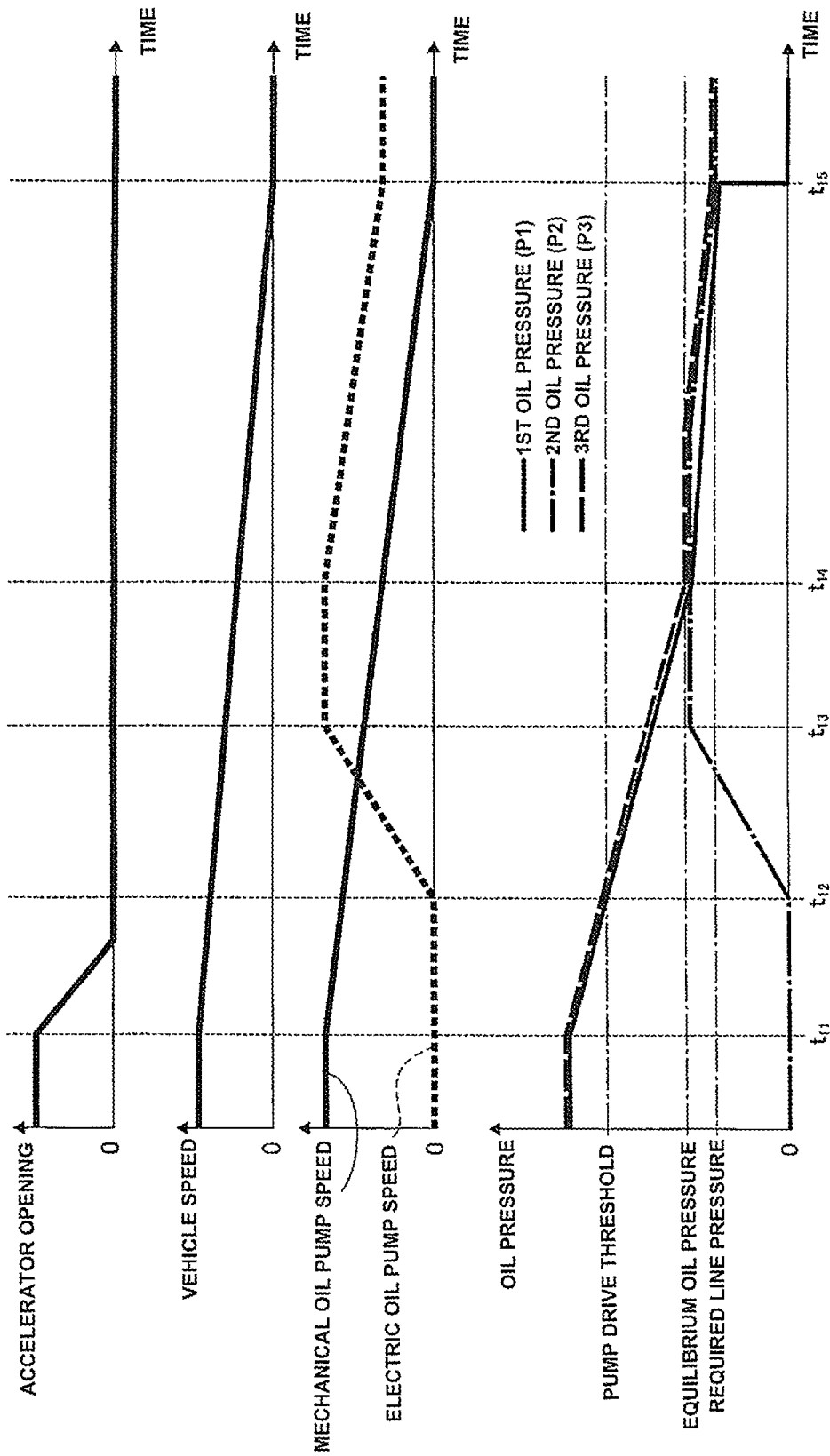
FIG. 5 is a time chart illustrating respective characteristics of an accelerator opening, a vehicle speed, a mechanical oil pump revolution speed, an electric oil pump revolution speed, a first oil pressure, a second oil pressure, and a third oil pressure, when switching an oil pressure source from a mechanical oil pump to an electric oil pump in the control device of the first embodiment.

Referring to FIG. 5, there is shown the time chart illustrating respective characteristics of the accelerator opening, the vehicle speed, the mechanical oil pump revolution speed, the electric oil pump revolution speed, the first oil pressure, the second oil pressure, and the third oil pressure, when switching the oil pressure source from the mechanical oil pump O/P to the electric oil pump M/O/P in the control device of the first embodiment. The required pressure securing operation when switching the oil pressure source in the first embodiment is hereunder explained in reference to FIG. 5.

In a situation where, during vehicle traveling, the required line pressure $PL_{ne}$ is provided or supplied by means of the mechanical oil pump O/P rotationally driven by the motor/generator MG, which is a traveling driving source, the first flapper valve 101a is kept open, while the second flapper valve 102a is kept closed. Thus, the third oil pressure P3 is determined based on the first oil pressure P1. Under this situation, when an accelerator release is made at the time $t_{11}$ shown in FIG. 5, the revolution speed of the motor/generator MG reduces and thus the vehicle speed gradually decreases. On the other hand, owing to the reducing revolution speed of motor/generator MG, the revolution speed of mechanical oil pump O/P also reduces, and thus the discharge flow rate of the mechanical oil pump decreases. Hence, the first oil pressure P1 also decreases. As a result of this, the third oil pressure P3 also decreases.

At the time $t_{12}$ when the first oil pressure P1 decreases below the preset pump drive threshold $P_{O/P}$, in the flowchart shown in FIG. 3 the routine flows from step S101 through steps S102, S103 to step S104 (see the flow of S101→S102→S103→S104). Thus, the driving of electric oil pump M/O/P is initiated, and then the electric oil pump M/O/P is placed into a high-speed mode of operation. At this time, owing to the second flapper valve 102a closed, the working oil supplied to the second oil passage 102 is stored or retained stagnant in the second oil passage and thus the second oil pressure P2 increases.

At the time $t_{13}$ when the second oil pressure P2 reaches the equilibrium oil pressure $P_{ba}$, which is an oil pressure value higher than the required line pressure $PL_{ne}$, the routine proceeds from step S105 through step S106 to step S107 (see the flow of S105→S106→S107). The electric oil pump M/O/P is switched to a slow-speed mode of operation, and thus the second oil pressure P2 is maintained at the equilibrium oil pressure $P_{ba}$. At this time, the first oil pressure P1 is still greater than the second oil pressure P2 (P1>P2), and hence the second flapper valve 102a is kept in its closed state. Thus, the third oil pressure P3 is determined by the first oil pressure P1.

On the other hand, the revolution speed of mechanical oil pump O/P continues reducing because of the vehicle speed decrease, and then the first oil pressure reaches the equilibrium oil pressure $P_{ba}$ at the time $t_{14}$. Hereby, the first oil pressure P1 becomes equal to the second oil pressure P2 (P1=P2), and thus the first and second flapper valves 101a, 102a are both placed in their open state. Thereafter, the first oil pressure P1 further continues decreasing, and hence the magnitude of the third oil pressure P3 is determined by the second oil pressure P2. In this manner, switching from an oil pressure supply by means of the mechanical oil pump O/P to an oil pressure supply by means of the electric oil pump M/O/P is made.

However, owing to shifting of the second flapper valve 102a, which has been kept in a slightly open state before the time $t_{14}$, into the wide open state, a drop in the third oil pressure P3 may occur owing to a temporary decrease in the second oil pressure P2. Also, the first oil pressure P1 continues decreasing. Therefore, it is impossible to increase the third oil pressure P3 by the first oil pressure P1, but in the first embodiment the second oil pressure P2 is maintained or kept at the equilibrium oil pressure $P_{ba}$ higher than the required line pressure $PL_{ne}$, and hence it is possible to prevent the third oil pressure P3 from dropping below the required line pressure $PL_{ne}$, even if a temporary decrease in the second oil pressure P2 occurs.

Additionally, the driving of electric oil pump M/O/P is initiated at the timing when the first oil pressure P1 becomes less than or equal to the pump drive threshold $P_{O/P}$, but the pump drive threshold $P_{O/P}$ is set as a value higher than the first oil pressure P1 at a point of time going back by a required time length from a time when the driving of electric oil pump M/O/P is initiated to a time when the second oil pressure P2 reaches the equilibrium oil pressure $P_{ba}$, from a timing at which the decreasing first oil pressure P1 becomes the equilibrium oil pressure $P_{ba}$. Hence, it is possible to increase the second oil pressure P2 up to the equilibrium oil pressure $P_{ba}$ before the first oil pressure P1 becomes the equilibrium oil pressure $P_{ba}$. That is, the decreasing first oil pressure P1 and the increasing second oil pressure P2 can be made to securely match at a predetermined oil pressure value (equilibrium oil pressure $P_{ba}$) higher than the required line pressure $PL_{ne}$. Therefore, it is possible to prevent the third oil pressure P3 from dropping below the required line pressure $PL_{ne}$ at the timing of switching of the oil pressure source. Accordingly, it is possible to prevent a power transmission member, for example the second clutch CL2 and/or the primary pulley Pri, from slipping.

Furthermore, in the first embodiment, at the time $t_{14}$ when the first oil pressure P1 and the second oil pressure P2 are made to match at the equilibrium oil pressure $P_{ba}$, the routine proceeds from step S108 through steps S109, S110 to step S111 (see the flow of S108→S109→S110→S111). Hence, the revolution speed of electric oil pump M/O/P reduces and thus a gradual decrease in the second oil pressure P2 is produced. Additionally, at this time, the revolution speed of electric oil pump M/O/P is controlled in such a manner that the second oil pressure P2 decreases under a specific condition that allows a given margin in comparison with a decrease in the first oil pressure P1. Hereby, after the time $t_{14}$, the first flapper valve 101a and the second flapper valve 102a can be both placed into their open states, while suppressing the oil pressure difference between the first oil pressure P1 and the second oil pressure P2. As a result of this, even if a drop in the third oil pressure occurs owing to a temporary decrease in the second oil pressure P2 at the time $t_{14}$, the third oil pressure can be quickly recovered. Therefore, after this point of time, the electric power consumption of electric oil pump M/O/P can be suppressed, while suppressing large fluctuations of the third oil pressure P3.

By the way, suppose that the second oil pressure P2 is rapidly decreased down to the required line pressure $PL_{ne}$ simultaneously with switching from an oil pressure supply by means of the mechanical oil pump O/P to an oil pressure supply by means of the electric oil pump M/O/P. In such a case, an undershoot takes place, and thus there is a possibility that the third oil pressure P3 drops below the required line pressure $PL_{ne}$. In contrast, in the shown embodiment, by virtue of a gradual decrease in the second oil pressure P2, it is possible to prevent a drop in the line pressure PL, while preventing an undesired undershoot.

Moreover, in the first embodiment, when gradually decreasing the second oil pressure P2, the electric oil pump revolution speed is controlled such that the second oil pressure P2 becomes kept higher than the first oil pressure P1 by the given margin. Therefore, even if the second oil pressure P2 becomes lower than the first oil pressure P1 owing to the oil pressure fluctuations and thus the second flapper valve 102a suddenly closes, it is possible to prevent the third oil pressure P3 from dropping below the required line pressure $PL_{ne}$.

Thereafter, immediately when the second oil pressure P2 is made to match the required line pressure $PL_{ne}$ at the time $t_{15}$, that is, at the timing at which the vehicle speed becomes zero, the routine proceeds from step S112 to step S113 (see the flow of S112→S113). Hence, the electric oil pump M/O/P is switched to a slow-speed mode of operation, for maintaining or keeping the second oil pressure P2 unchanged. Also, at the time $t_{15}$ the motor/generator MG is stopped by idling-stop control, and therefore the revolution speed of mechanical oil pump O/P becomes zero and as a result the first oil pressure P1 also becomes zero.

[Other Characteristic Operations]

Additionally, in the first embodiment, the equilibrium oil pressure $P_{ba}$, which is an oil pressure value at which the first oil pressure P1 and the second oil pressure P2 are made to match, is set as a value obtained by adding a correction value (obtained by experiments or the like) for oil pressure fluctuations, occurring when the first oil pressure P1 and the second oil pressure P2 have matched, to the required line pressure $PL_{ne}$. That is to say, a value obtained by adding a correction value for fluctuations of the third oil pressure P3, resulting from a temporary decrease in the second oil pressure P2 owing to shifting of the second flapper valve 102a, which has been kept in a slightly open state, into the wide open state, to the required line pressure PL, is set as the equilibrium oil pressure $P_{ba}$. Therefore, it is possible to suppress the electric power consumption of electric oil pump M/O/P, while suppressing the second oil pressure P2 from undesirably increasing.

Furthermore, in the first embodiment, the pump drive threshold $P_{O/P}$ is set as a value higher than the first oil pressure P1 at a point of time going back by a required time length from a time when the driving of electric oil pump M/O/P is initiated to a time when the second oil pressure P2 reaches the equilibrium oil pressure $P_{ba}$, from a timing at which the decreasing first oil pressure P1 becomes the equilibrium oil pressure $P_{ba}$. That is, the second oil pressure P2 is maintained or kept at the equilibrium oil pressure $P_{ba}$ during a time period from the time when the second oil pressure P2 reaches the equilibrium oil pressure $P_{ba}$ to the time when the second oil pressure P2 matches the first oil pressure P1. Hereby, the second oil pressure P2 is controlled to match the first oil pressure P1, while maintaining at the equilibrium oil pressure $P_{ba}$. Hence, it is possible to securely prevent the first oil pressure P1 and the second oil pressure P2 from matching at an oil pressure value below the equilibrium oil pressure $P_{ba}$. As a result of this, it is possible to prevent the third oil pressure P3 from dropping below the required line pressure $PL_{ne}$.

Next, the effects are explained. The oil pressure control device for the vehicle of the first embodiment can provide the following enumerative effects.

(1) An oil pressure control device for a vehicle is configured to have a first oil pump (mechanical oil pump O/P) driven by a traveling driving source (motor/generator MG) for an oil pressure supply, a second oil pump (electric oil pump M/O/P) driven by an electric motor (sub-motor S/M) separate from the traveling driving source (motor/generator MG) for an oil pressure supply, a ratio adjusting valve (first flapper valve 101a, second flapper valve 102a) provided to adjust a supply ratio of oil supplied from the first oil pump (mechanical oil pump O/P) and a supply ratio of oil supplied from the second oil pump (electric oil pump M/O/P), based on an oil pressure difference between a first oil pump discharge pressure (first oil pressure P1) and a second oil pump discharge pressure (second oil pressure P2), and a second oil pump controller (integrated controller 10) configured to set a predetermined oil pressure value higher than a required line pressure $PL_{ne}$ as an equilibrium oil pressure $P_{ba}$ and set a predetermined oil pressure value higher than the equilibrium oil pressure $P_{ba}$ as a pump drive threshold $P_{O/P}$, when switching from the oil pressure supply by means of the first oil pump (mechanical oil pump O/P) to the oil pressure supply by means of the second oil pump (electric oil pump M/O/P) due to a decrease in the first oil pump discharge pressure (first oil pressure P1), and also configured to initiate an increase in the second oil pump discharge pressure (second oil pressure P2) by driving the second oil pump (electric oil pump M/O/P) and permit the first oil pump discharge pressure (first oil pressure P1) and the second oil pump discharge pressure (second oil pressure P2) to be made to match at the equilibrium oil pressure $P_{ba}$, when the first oil pump discharge pressure (first oil pressure P1) becomes less than or equal to the pump drive threshold $P_{O/P}$. Hereby, it is possible to prevent the oil pressure from the oil pressure source from dropping below the required line pressure $PL_{ne}$, when switching from the oil pressure supply by means of the mechanical oil pump O/P to the oil pressure supply by means of the electric oil pump M/O/P.

(2) The second oil pump controller (integrated controller 10) is configured to initiate a gradual decrease in the second oil pump discharge pressure (second oil pressure P2) down to the required line pressure $PL_{ne}$, when the first oil pump discharge pressure (first oil pressure P1) and the second oil pump discharge pressure (second oil pressure P2) have matched. Hereby, in addition to the aforementioned effect (1), it is possible to prevent a drop in line pressure PL, while preventing an undershoot of the third oil pressure P3.

(3) The second oil pump controller (integrated controller 10) is configured to set a value obtained by adding a correction value for oil pressure fluctuations, occurring when the first oil pump discharge pressure (first oil pressure P1) and the second oil pump discharge pressure (second oil pressure P2) have matched, to the required line pressure $PL_{ne}$ as the equilibrium oil pressure $P_{ba}$. Hereby, in addition to the aforementioned effects (1) or (2), it is possible to suppress the electric power consumption of electric oil pump M/O/P, while suppressing the second oil pressure P2 from undesirably increasing when switching the oil pressure source.

(4) The second oil pump controller (integrated controller 10) is configured to maintain the second oil pump discharge pressure (second oil pressure P2) at the equilibrium oil pressure $P_{ba}$ during a time period from a time when the second oil pump discharge pressure (second oil pressure P2) reaches the equilibrium oil pressure $P_{ba}$ to a time when the second oil pump discharge pressure (second oil pressure P2) matches the first oil pump discharge pressure (first oil pressure P1). Hereby, in addition to the aforementioned effect (3), it is possible to securely prevent the first oil pressure P1 and the second oil pressure P2 from matching at an oil pressure value below the equilibrium oil pressure $P_{ba}$, thereby preventing the third oil pressure P3 from dropping below the required line pressure $PL_{ne}$.

Second Embodiment

The second embodiment is an instance in which, when the first oil pressure P1 is decreasing, the second oil pressure P2 continues increasing until such time that the second oil pressure P2 matches the first oil pressure P1.

Figure 6:
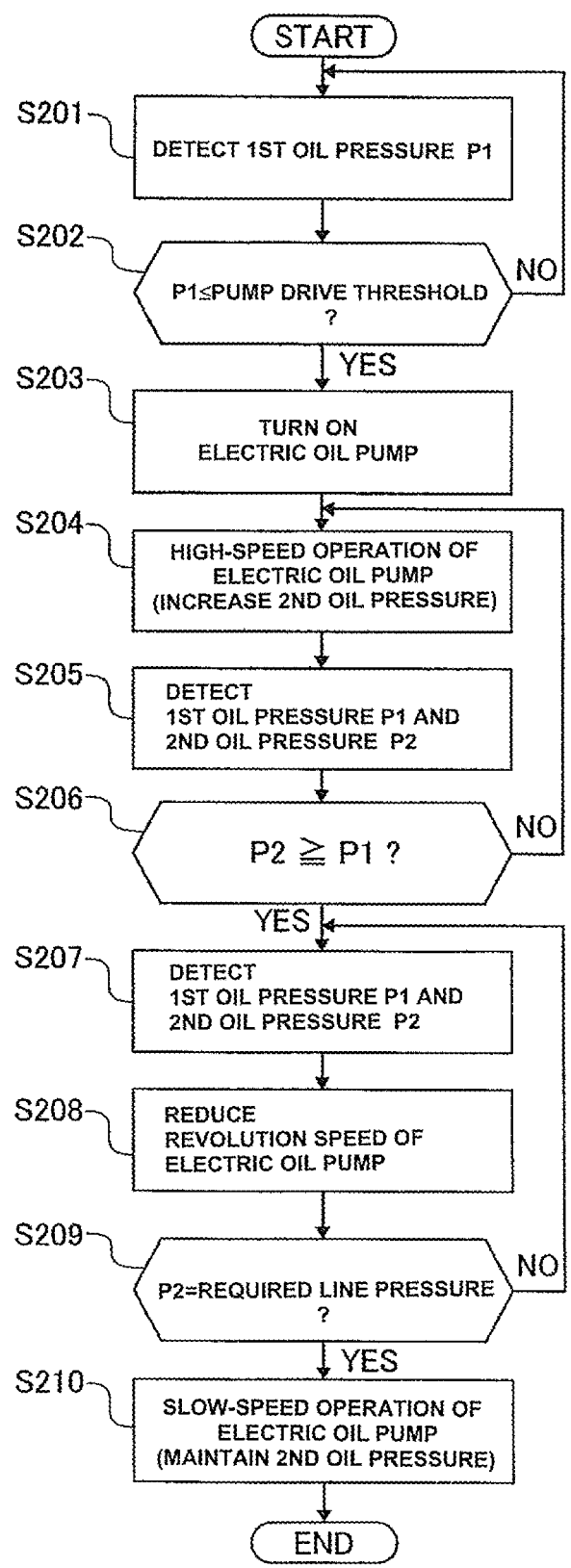
FIG. 6 is a flowchart illustrating a flow of pump switching control processing executed within an integrated controller in a second embodiment.

Referring to FIG. 6, there is shown the flowchart illustrating the flow of pump switching control processing executed within the integrated controller 10 of the second embodiment. Respective steps of FIG. 6 showing the pump switching control processing configuration of the second embodiment are hereunder explained. By the way, the pump switching control processing is initiated when the accelerator is brought into an OFF (released) condition under a state where, during traveling, the revolution speed of mechanical oil pump O/P is sufficiently high, and as a result the revolution speed of motor/generator MG reduces, the vehicle speed decreases, and further the revolution speed of mechanical oil pump O/P reduces. That is, the pump switching control processing is initiated or triggered by a transition of the accelerator to its OFF condition during traveling.

At step S201, the first oil pressure P1 is detected, and then the routine proceeds to step S202.

Subsequently to the detection of the first oil pressure P1 at step S201, at step S202 a check is made to determine whether the detected first oil pressure P1 is less than or equal to a preset pump drive threshold $P_{O/P}$. When the answer to this step is YES (i.e., P1 pump drive threshold $P_{O/P}$), a determination is made that a required line pressure $PL_{ne}$ cannot be provided by only the working oil from the mechanical oil pump O/P, and then the routine proceeds to step S203. Conversely when the answer to this step is NO (i.e., P1>pump drive threshold $P_{O/P}$), a determination is made that the required line pressure $PL_{ne}$ can be provided by only the working oil from the mechanical oil pump O/P, and then the routine returns back to step S201. By the way, the previously-discussed "pump drive threshold $P_{O/P}$" is an oil pressure value higher than the required line pressure $PL_{ne}$ and also higher than the equilibrium oil pressure $P_{ba}$. The "pump drive threshold $P_{O/P}$" is set as a value corresponding to the first oil pressure P1 at a point of time going back by a required time length from a time when the driving of electric oil pump M/O/P is initiated to a time when the second oil pressure P2 reaches the predetermined equilibrium oil pressure $P_{ba}$ higher than the required line pressure $PL_{ne}$, from a timing at which the decreasing first oil pressure P1 becomes the equilibrium oil pressure $P_{ba}$. The definition of the "required line pressure $PL_{ne}$" is the same as the first embodiment, and thus detailed description will be omitted because the above description thereon seems to be self-explanatory.

Subsequently to the determination of P1≤pump drive threshold $P_{O/P}$ at step S202, at step S203 the driving of electric oil pump M/O/P is initiated by operating the sub-motor S/M, and then the routine proceeds to step S204.

Subsequently to the initiation of driving of electric oil pump M/O/P at step S203, at step S204 the electric oil pump M/O/P is placed into a high-speed mode of operation, and then the routine proceeds to step S205. At this time, owing to the second flapper valve 102a closed, the working oil discharged from the electric oil pump M/O/P is stored or retained stagnant in the second oil passage 102 and thus the second oil pressure P2 increases.

Subsequently to the high-speed operation of electric oil pump M/O/P (i.e., the increase in the second oil pressure P2) at step S204, at step S205 the first oil pressure P1 and the second oil pressure P2 are detected respectively, and then the routine proceeds to step S206.

Subsequently to the detection of the first and second oil pressures P1, P2 at step S205, at step S206 a check is made to determine whether the detected second oil pressure P2 is greater than or equal to the first oil pressure P1. When the answer to this step is YES (i.e., P2≥first oil pressure P1), a determination is made that the second oil pressure P2 has matched the first oil pressure, and then the routine proceeds to step S207. Conversely when the answer to this step is NO (i.e., P2<first oil pressure P1), a determination is made that the second oil pressure P2 has not yet matched the first oil pressure P1, and then the routine returns to step S204.

Subsequently to the determination of P2≥first oil pressure P1 at step S206, at step S207 the first oil pressure P1 and the second oil pressure P2 are detected respectively, and then the routine proceeds to step S208.

Subsequently to the detection of the first and second oil pressures P1, P2 at step S207, at step S208 the output of sub-motor S/M is decreased such that the revolution speed of electric oil pump M/O/P reduces and thus a gradual decrease in the second oil pressure P2 is produced, and then the routine proceeds to step S209. At this time, the revolution speed of electric oil pump M/O/P is controlled in such a manner that the second oil pressure P2 decreases under a specific condition that allows a given margin taking fluctuations of the second oil pressure P2 into account, in comparison with a decrease in the first oil pressure P1. That is, the electric oil pump revolution speed is controlled such that the second oil pressure P2 becomes kept higher than the first oil pressure P1 by the given margin.

Subsequently to the reduction in revolution speed of electric oil pump M/O/P at step S208, at step S209 a check is made to determine whether the second oil pressure P2 reaches the required line pressure $PL_{ne}$. When the answer to this step is YES (i.e., P2=required line pressure $PL_{ne}$), the routine proceeds to step S210. Conversely when the answer to this step is NO (i.e., P2>required line pressure $PL_{ne}$), the routine returns to step S207.

Subsequently to the determination of P2=required line pressure $PL_{ne}$ at step S209, at step S210 the output of sub-motor S/M is decreased such that the electric oil pump M/O/P is placed into a slow-speed mode of operation, and then this routine ends. At this time, the second oil pressure P2 is maintained or kept at the required line pressure $PL_{ne}$ by controlling the discharge flow rate of electric oil pump M/O/P in such a manner as to balance with the required line pressure $PL_{ne}$.

Figure 7:
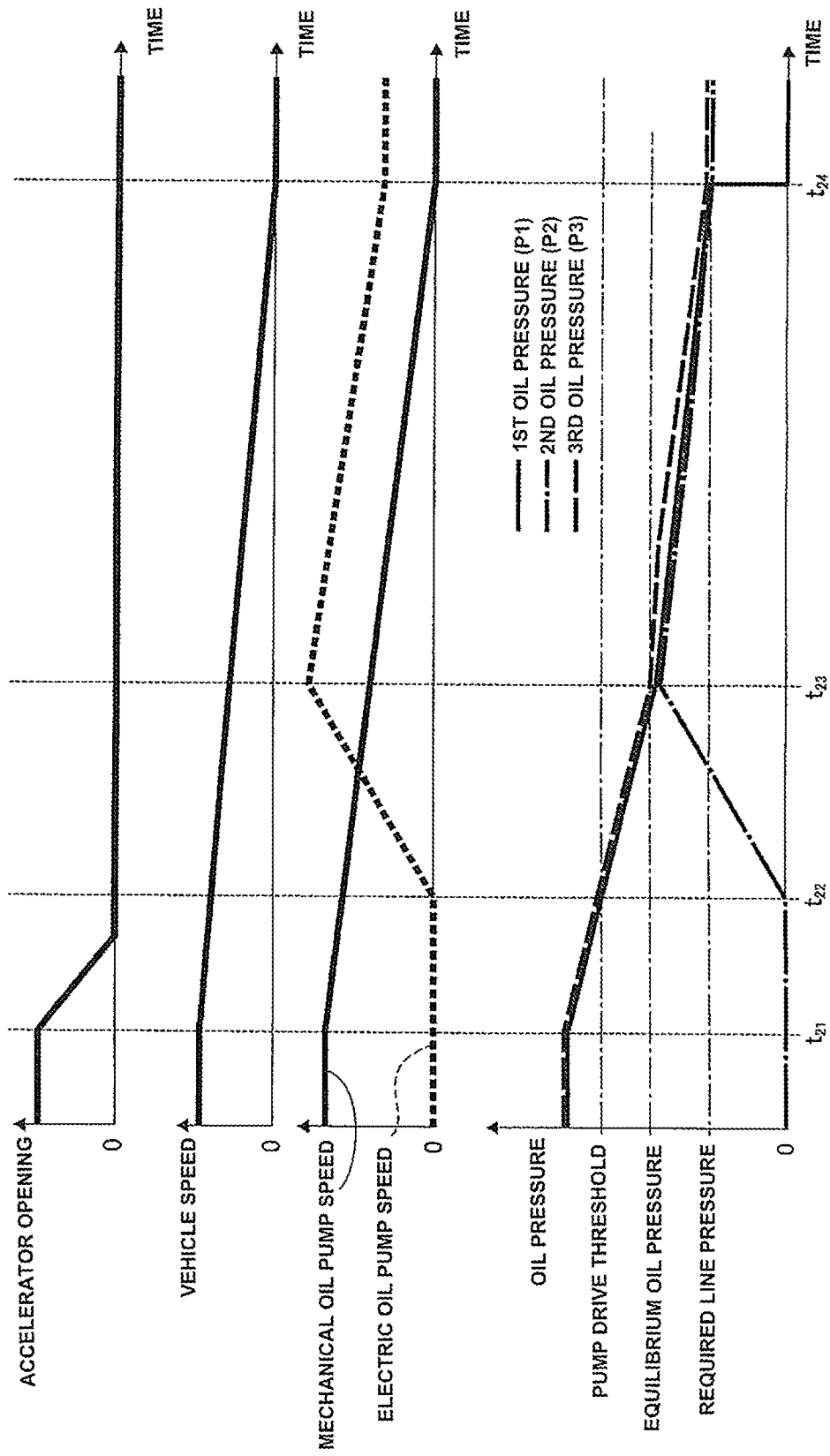
FIG. 7 is a time chart illustrating respective characteristics of an accelerator opening, a vehicle speed, a mechanical oil pump revolution speed, an electric oil pump revolution speed, a first oil pressure, a second oil pressure, and a third oil pressure, when switching an oil pressure source from a mechanical oil pump to an electric oil pump in the control device of the second embodiment.

Next, the operation of the oil pressure control device for the vehicle of the second embodiment is explained in reference to the time chart shown in FIG. 7.

Under a situation where, during vehicle traveling, the required line pressure $PL_{ne}$ is provided or supplied by means of the mechanical oil pump O/P rotationally driven by the motor/generator MG, which is a traveling driving source, when an accelerator release is made at the time $t_{21}$ shown in FIG. 7, the revolution speed of the motor/generator MG reduces and thus the vehicle speed gradually decreases. On the other hand, the revolution speed of mechanical oil pump O/P also reduces, and hence the first oil pressure P1 also decreases. As a result of this, the third oil pressure P3 also decreases.

At the time $t_{22}$ when the first oil pressure P1 decreases below the pump drive threshold $P_{O/P}$, in the flowchart shown in FIG. 6 the routine flows from step S201 through steps S202, S203 to step S204 (see the flow of S201→S202→S203→S204). Thus, the driving of electric oil pump M/O/P is initiated, and thus the second oil pressure P2 increases.

At the time $t_{23}$ when the increasing second oil pressure P2 matches the gradually decreasing first oil pressure P1, the routine proceeds from step S205 through step S206, S207 to step S208 (see the flow of S205→S206→S207→S208). Hence, the revolution speed of electric oil pump M/O/P reduces and thus a gradual decrease in the second oil pressure P2 is produced.

In this manner, in the second embodiment, when driving the electric oil pump M/O/P, the second oil pressure P2 continues increasing under the continuous high-speed operation of electric oil pump M/O/P until such time that the second oil pressure P2 matches the first oil pressure P1. Hereby, under a condition where the second oil pressure P2 is increasing, the first oil pressure P1 can be made to match the second oil pressure. As a result of this, the first oil pressure P1 becomes equal to the second oil pressure P2 (P1=P2). Therefore, even if the second flapper valve 102a opens at a stroke and thus a temporary decrease in the second oil pressure P2 occurs, it is possible to suppress the second oil pressure P2 from decreasing, thereby suppressing a drop in the third oil pressure P3.

Additionally, in the second embodiment, the "pump drive threshold $P_{O/P}$" is set as a value corresponding to the first oil pressure P1 at a point of time going back by a required time length from a time when the driving of electric oil pump M/O/P is initiated to a time when the second oil pressure P2 reaches the predetermined equilibrium oil pressure $P_{ba}$ higher than the required line pressure $PL_{ne}$, from a timing at which the decreasing first oil pressure P1 becomes the equilibrium oil pressure $P_{ba}$. Therefore, the first oil pressure P1 and the second oil pressure P2 can be made to match before the first oil pressure P1 decreases below the required line pressure $PL_{ne}$. Hence it is possible to prevent the third oil pressure P3 from dropping below the required line pressure $PL_{ne}$.

That is, the second embodiment can provide the following effect.

(5) The second oil pump controller (integrated controller 10) is configured to increase the second oil pump discharge pressure (second oil pressure P2) during a time period from a time when an increase in the second oil pump discharge pressure (second oil pressure P2) is initiated to a time when the second oil pump discharge pressure (second oil pressure P2) matches the first oil pump discharge pressure (first oil pressure P1). Hereby, under a condition where the second oil pressure P2 is increasing, the first oil pressure P1 can be made to match the second oil pressure. Hence, it is possible to suppress a decrease in the second oil pressure P2 when switching the oil pressure source, thereby suppressing a drop in the third oil pressure P3.

Third Embodiment

The third embodiment is an instance in which the first oil pressure P1 and the second oil pressure P2 are made to match at a relief pressure at which the pressure leak valve 28a located in the second oil passage 102 becomes open.

Figure 8:
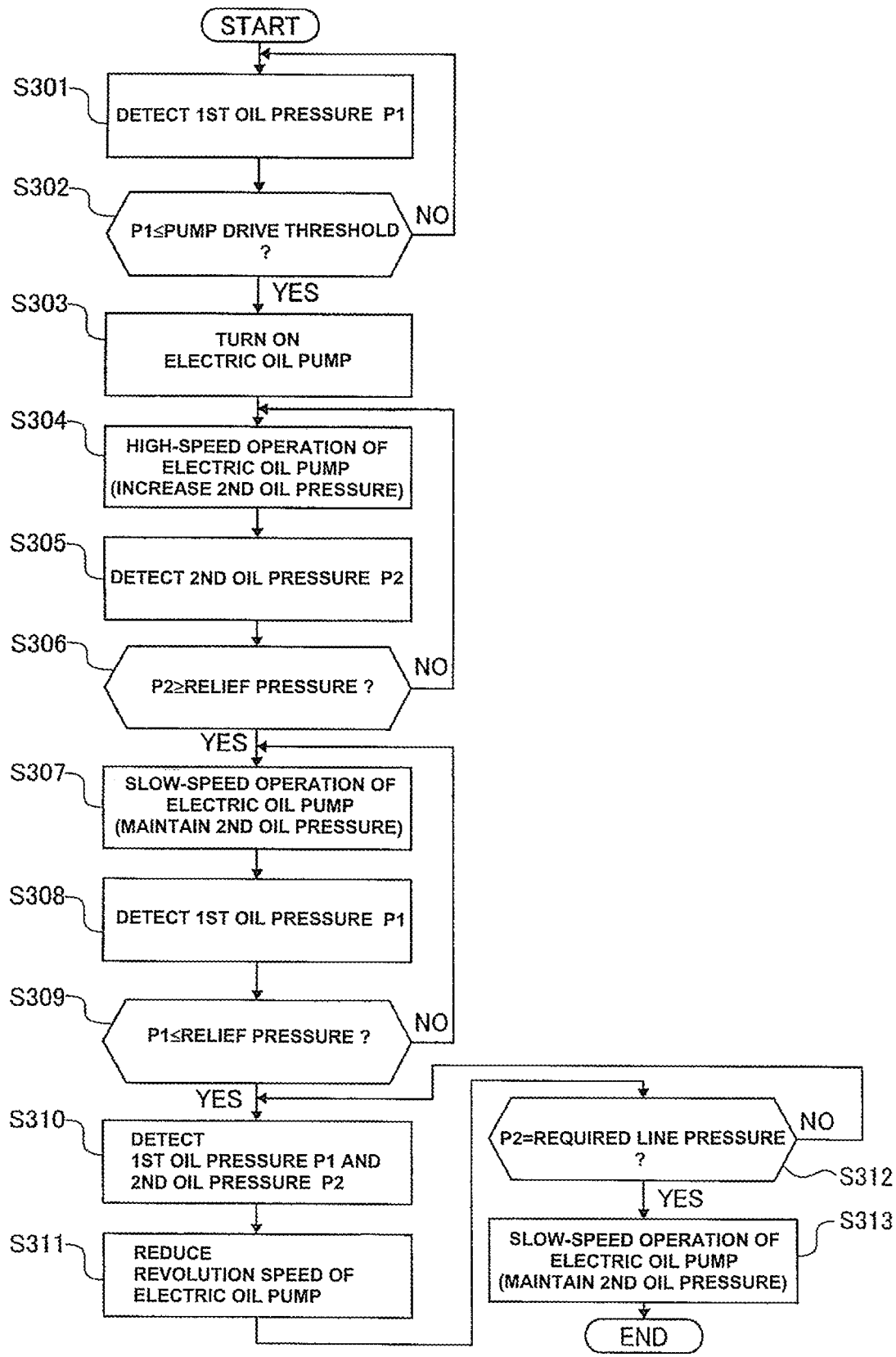
FIG. 8 is a flowchart illustrating a flow of pump switching control processing executed within an integrated controller in a third embodiment.

Referring to FIG. 8, there is shown the flowchart illustrating the flow of pump switching control processing executed within the integrated controller 10 of the third embodiment. Respective steps of FIG. 8 showing the pump switching control processing configuration of the third embodiment are hereunder explained. By the way, the pump switching control processing is initiated when the accelerator is brought into an OFF (released) condition under a state where, during traveling, the revolution speed of mechanical oil pump O/P is sufficiently high, and as a result the revolution speed of motor/generator MG reduces, the vehicle speed decreases, and further the revolution speed of mechanical oil pump O/P reduces. That is, the pump switching control processing is initiated or triggered by a transition of the accelerator to its OFF condition during traveling.

At step S301, the first oil pressure P1 is detected, and then the routine proceeds to step S302.

Subsequently to the detection of the first oil pressure P1 at step S301, at step S302 a check is made to determine whether the detected first oil pressure P1 is less than or equal to a preset pump drive threshold $P_{O/P}$. When the answer to this step is YES (i.e., P1≤pump drive threshold $P_{O/P}$), a determination is made that a required line pressure $PL_{ne}$ cannot be provided by only the working oil from the mechanical oil pump O/P, and then the routine proceeds to step S303. Conversely when the answer to this step is NO (i.e., P1>pump drive threshold $P_{O/P}$), a determination is made that the required line pressure $PL_{ne}$ can be provided by only the working oil from the mechanical oil pump O/P, and then the routine returns back to step S301. By the way, the previously-discussed "pump drive threshold $P_{O/P}$" is an oil pressure value higher than the required line pressure $PL_{ne}$ and also higher than the relief pressure $P_{re}$. The "pump drive threshold $P_{O/P}$" is set as a value higher than the first oil pressure P1 at a point of time going back by a required time length from a time when the driving of electric oil pump M/O/P is initiated to a time when the second oil pressure P2 reaches the relief pressure $P_{re}$, from a timing at which the decreasing first oil pressure P1 becomes the relief pressure $P_{re}$. The definition of the "required line pressure $PL_{ne}$" is the same as the first embodiment, and thus detailed description will be omitted because the above description thereon seems to be self-explanatory.

Subsequently to the determination of P1 pump drive threshold $P_{O/P}$ at step S302, at step S303 the driving of electric oil pump M/O/P is initiated by operating the sub-motor S/M, and then the routine proceeds to step S304.

Subsequently to the initiation of driving of electric oil pump M/O/P at step S303, at step S304 the electric oil pump M/O/P is placed into a high-speed mode of operation, and then the routine proceeds to step S305. At this time, owing to the second flapper valve 102a closed, the working oil discharged from the electric oil pump M/O/P is stored or retained stagnant in the second oil passage 102 and thus the second oil pressure P2 increases.

Subsequently to the high-speed operation of electric oil pump M/O/P (i.e., the increase in the second oil pressure P2) at step S304, at step S305 the second oil pressure P2 is detected, and then the routine proceeds to step S306.

Subsequently to the detection of the second oil pressure P2 at step S305, at step S306 a check is made to determine whether the detected second oil pressure P2 is greater than or equal to the relief pressure $P_{re}$. When the answer to this step is YES (i.e., P2≥relief pressure $P_{re}$), a determination is made that the second oil pressure P2 has reached its target pressure, and then the routine proceeds to step S307. Conversely when the answer to this step is NO (i.e., P2<relief pressure $P_{re}$), a determination is made that the second oil pressure P2 has not yet reached its target pressure, and then the routine returns to step S304. By the way, the previously-discussed "relief pressure $P_{re}$" is an oil pressure value higher than the required line pressure $PL_{ne}$. The relief pressure $P_{re}$ is an upper limit of the second oil pressure P2, which is set for preventing undesirable breakage of electric oil pump M/O/P.

Subsequently to the determination of P2≥relief pressure $P_{re}$ at step S306, at step S307 the output of sub-motor S/M is decreased such that the electric oil pump M/O/P is placed into a slow-speed mode of operation, and then the routine proceeds to step S308. At this time, the second oil pressure P2 is maintained or kept at the relief pressure $P_{re}$ by controlling the discharge flow rate of electric oil pump M/O/P in such a manner as to balance with the second oil pressure P2.

Subsequently to the slow-speed operation of electric oil pump M/O/P (i.e., the keeping of the second oil pressure P2) at step S307, at step S308 the first oil pressure P1 is detected, and then the routine proceeds to step S309.

Subsequently to the detection of the first oil pressure P1 at step S308, at step S309 a check is made to determine whether the detected first oil pressure P1 is less than or equal to the relief pressure $P_{re}$. When the answer to this step is YES (i.e., P1≤relief pressure $P_{re}$), a determination is made that the first oil pressure P1 and the second oil pressure P2 have matched, and then the routine proceeds to step S310. Conversely when the answer to this step is NO (i.e., P1>relief pressure $P_{re}$), a determination is made that the first oil pressure P1 and the second oil pressure P2 have not yet matched, and then the routine returns to step S307.

Subsequently to the determination of P1≤relief pressure $P_{re}$ at step S309, at step S310 the first oil pressure P1 and the second oil pressure P2 are detected respectively, and then the routine proceeds to step S311.

Subsequently to the detection of the first and second oil pressures P1, P2 at step S310, at step S311 the output of sub-motor S/M is decreased such that the revolution speed of electric oil pump M/O/P reduces and thus a gradual decrease in the second oil pressure P2 is produced, and then the routine proceeds to step S312. At this time, the revolution speed of electric oil pump M/O/P is controlled in such a manner that the second oil pressure P2 decreases under a specific condition that allows a given margin taking fluctuations of the second oil pressure P2 into account, in comparison with a decrease in the first oil pressure P1. That is, the electric oil pump revolution speed is controlled such that the second oil pressure P2 becomes kept higher than the first oil pressure P1 by the given margin.

Subsequently to the reduction in revolution speed of electric oil pump M/O/P at step S311, at step S312 a check is made to determine whether the second oil pressure P2 reaches the required line pressure $PL_{ne}$. When the answer to this step is YES (i.e., P2=required line pressure $PL_{ne}$), the routine proceeds to step S313. Conversely when the answer to this step is NO (i.e., P2>required line pressure $PL_{ne}$), the routine returns to step S310.

Subsequently to the determination of P2=required line pressure $PL_{ne}$ at step S312, at step S313 the output of sub-motor S/M is decreased such that the electric oil pump M/O/P is placed into a slow-speed mode of operation, and then this routine ends. At this time, the second oil pressure P2 is maintained or kept at the required line pressure $PL_{ne}$ by controlling the discharge flow rate of electric oil pump M/O/P in such a manner as to balance with the required line pressure $PL_{ne}$.

Figure 9:
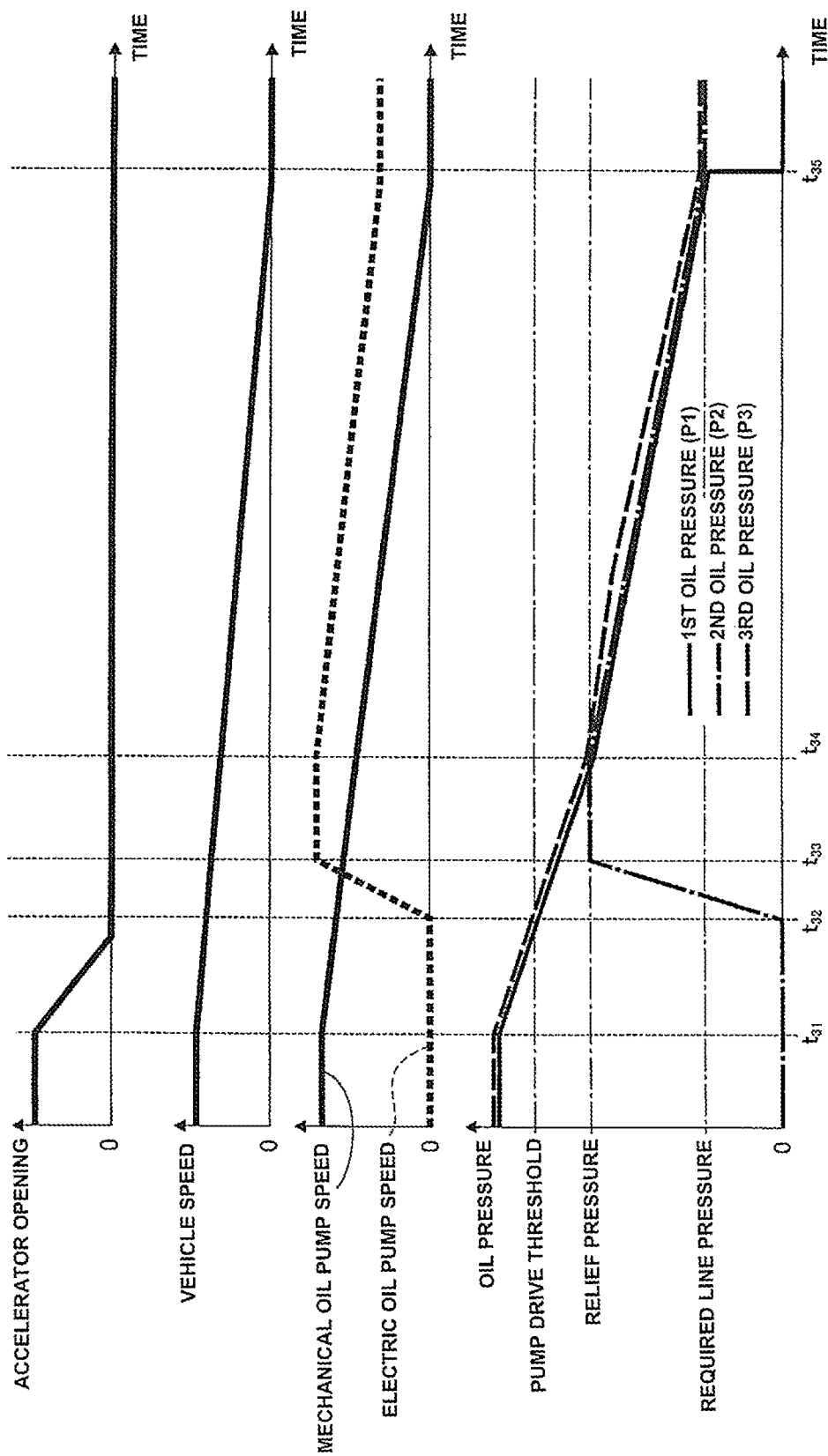
FIG. 9 is a time chart illustrating respective characteristics of an accelerator opening, a vehicle speed, a mechanical oil pump revolution speed, an electric oil pump revolution speed, a first oil pressure, a second oil pressure, and a third oil pressure, when switching an oil pressure source from a mechanical oil pump to an electric oil pump in the control device of the third embodiment.

Next, the operation of the oil pressure control device for the vehicle of the third embodiment is explained in reference to the time chart shown in FIG. 9.

Under a situation where, during vehicle traveling, the required line pressure $PL_{ne}$ is provided or supplied by means of the mechanical oil pump O/P rotationally driven by the motor/generator MG, which is a traveling driving source, when an accelerator release is made at the time $t_{31}$ shown in FIG. 9, the revolution speed of the motor/generator MG reduces and thus the vehicle speed gradually decreases. On the other hand, the revolution speed of mechanical oil pump O/P also reduces, and hence the first oil pressure P1 also decreases. As a result of this, the third oil pressure P3 also decreases.

At the time $t_{32}$ when the first oil pressure P1 decreases below the pump drive threshold $P_{O/P}$, in the flowchart shown in FIG. 8 the routine flows from step S301 through steps S302, S303 to step S304 (see the flow of S301→S302→S303→S304). Thus, the driving of electric oil pump M/O/P is initiated, and thus the second oil pressure P2 increases.

At the time $t_{33}$ when the second oil pressure P2 reaches the relief pressure $P_{re}$, the routine proceeds from step S305 through step S306 to step S307 (see the flow of S305→S306→S307). The electric oil pump M/O/P is switched to a slow-speed mode of operation, and thus the second oil pressure P2 is maintained at the relief pressure $P_{re}$. On the other hand, the revolution speed of mechanical oil pump O/P continues reducing because of the vehicle speed decrease, and then the first oil pressure reaches the relief pressure $P_{re}$.

When the second oil pressure P2, which is maintained at the relief pressure $P_{re}$, and the gradually decreasing first oil pressure P1 have matched, the routine proceeds from step S308 through steps S309, S310, S311, S312 to step S313 (see the flow of S308→S309→S310→S311→S312→S313). Hence, the revolution speed of electric oil pump M/O/P reduces and thus a gradual decrease in the second oil pressure P2 is produced.

In this manner, in the third embodiment, the first oil pressure P1 and the second oil pressure P2 are made to match at the relief pressure $P_{re}$ at which the pressure leak valve 28a, which is located in the second oil passage 102 through which working oil discharged from the electric oil pump M/O/P flows, opens. That is, the relief pressure Pre is set as the "equilibrium oil pressure $P_{ba}$" at which the first oil pressure P1 and the second oil pressure P2 are made to match.

By the way, a decreasing gradient of the first oil pressure P1 is in proportion to a deceleration of the vehicle. That is, the rapider the deceleration, the greater the decreasing gradient of the first oil pressure P1, thus decreasing faster. Therefore, in the case of a rapid deceleration, a drop in the third oil pressure P3 occurring when the first oil pressure P1 becomes equal to the second oil pressure P2 (P1=P2) becomes greater. When the pressure difference between the "equilibrium oil pressure $P_{ba}$" and the "required line pressure $PL_{ne}$" is suppressed, there is a possibility that the third oil pressure P3 drops below the required line pressure $PL_{ne}$. In contrast, in the case that the "relief pressure P," is set as the "equilibrium oil pressure $P_{ba}$" and thus the first oil pressure P1 and the second oil pressure P2 are made to match at the relief pressure $P_{re}$, it is possible to increase the second oil pressure P2 at the timing of switching of the oil pressure source up to a very high pressure level. As a result of this, even if a drop in the third oil pressure P3, occurring when the first oil pressure P1 has become equal to the second oil pressure P2 (P1=P2), becomes greater under a rapid deceleration condition, it is possible to prevent the third oil pressure from dropping below the required line pressure $PL_{ne}$.

Furthermore, in the third embodiment, the pump drive threshold $P_{O/P}$ is set as a value higher than the first oil pressure P1 at a point of time going back by a required time length from a time when the driving of electric oil pump M/O/P is initiated to a time when the second oil pressure P2 reaches the relief pressure $P_{re}$, from a timing at which the decreasing first oil pressure P1 becomes the relief pressure $P_{re}$. That is, the second oil pressure P2 is maintained or kept at the relief pressure $P_{re}$ during a time period from the time when the second oil pressure P2 reaches the relief pressure $P_{re}$ to the time when the second oil pressure P2 matches the first oil pressure P1. Hereby, the second oil pressure P2 is controlled to match the first oil pressure P1, while maintaining at the relief pressure $P_{re}$. Hence, it is possible to securely prevent the first oil pressure P1 and the second oil pressure P2 from matching at an oil pressure value below the relief pressure $P_{re}$. As a result of this, it is possible to prevent the third oil pressure P3 from dropping below the required line pressure $PL_{ne}$ even during a rapid deceleration.

(6) The second oil pump controller (integrated controller 10) is configured to set a relief pressure $P_{re}$, at which a pressure leak valve 28a located in a discharge oil passage (second oil passage 102) of the second oil pump (electric oil pump M/O/P) becomes open, as the equilibrium oil pressure $P_{ba}$. Hereby, even if, during a rapid deceleration or the like, a drop in the third oil pressure P3, occurring when the oil pressure supply of the first oil pressure P1 is stopped, is greater, it is possible to prevent the third oil pressure P3 from dropping below the required line pressure $PL_{ne}$.

While the foregoing is a description of the preferred embodiments carried out the invention and explained in reference to the first to third embodiments, it will be understood that the invention is not limited to the particular embodiments shown and described herein, but that various design changes and modifications may be made without departing from the scope or spirit of this invention.

In the first embodiment, as a ratio adjusting valve for adjusting a supply ratio of oil supplied from the mechanical oil pump O/P and a supply ratio of oil supplied from the electric oil pump M/O/P, based on an oil pressure difference between the first oil pressure P1 and the second oil pressure P2, the first flapper valve 101a and the second flapper valve 102a are shown and described herein, but the ratio adjusting valve is not limited to such valves. For instance, a pressure regulating valve, which is located at a confluent position at which the first oil passage 101 through which working oil discharged from the mechanical oil pump O/P flows and the second oil passage 102 through which working oil discharged from the electric oil pump M/O/P flows are merged together for controlling a ratio of the first oil pressure P1 and the second oil pressure P2 and for achieving an oil pressure supply to the line pressure regulating valve 104 at a controlled ratio, may be used.

Also, as an example, in the third embodiment, the second oil pressure P2 is increased up to the relief pressure $P_{re}$ before the first oil pressure P1 becomes the relief pressure $P_{re}$, and then the second oil pressure P2 is maintained at the relief pressure $P_{re}$, but the invention is not limited to the particular embodiment. For instance, the timing at which the first oil pressure P1 decreases down to the relief pressure $P_{re}$ and the timing at which the second oil pressure P2 increases up to the relief pressure Pre may match. That is, the pump drive threshold $P_{O/P}$ may be set as the first oil pressure P1 at a point of time going back by a required time length from a time when the driving of electric oil pump M/O/P is initiated to a time when the second oil pressure P2 reaches the relief pressure $P_{re}$, from a timing at which the decreasing first oil pressure P1 becomes the relief pressure $P_{re}$. This eliminates the necessity of maintaining the second oil pressure P2 at the relief pressure $P_{re}$, and thus it is possible to suppress the electric power consumption of electric oil pump M/O/P.

As an example, in the first to third embodiments, the control processing is initiated or triggered by a foot-off operation of the accelerator during traveling, but the invention is not limited to the particular embodiments shown herein. In lieu thereof, for instance, the control processing may be initiated or triggered by idle-stop control before vehicle stop, in which the traveling driving source is automatically stopped immediately before stopping the vehicle or coasting control, in which the traveling driving source is automatically stopped when the accelerator pedal and the brake pedal are both released for the purpose of coasting during high vehicle speed traveling.

Also, as an example, in the first embodiment, the oil pressure control device for the vehicle according to the invention is applied to a hybrid having both an engine Eng and a motor/generator MG, but not limited to such a hybrid vehicle. In lieu thereof, the control device of the invention may be applied to an electric vehicle on which only the motor/generator MG is mounted, an engine vehicle on which only the engine Eng is mounted, a plug-in hybrid vehicle, a fuel cell vehicle or the like.

Furthermore, the "equilibrium oil pressure $P_{ba}$" may be appropriately changed or switched depending on a state of the vehicle, such as vehicle deceleration or vehicle speed, in a manner so as to be set to the relief pressure $P_{re}$ or a value which is obtained by adding a predetermined correction value to the required line pressure. Hereby, depending on a state of the vehicle, it is possible to appropriately prevent the line pressure PL from dropping when switching the oil pressure source.

The invention claimed is:

1. An oil pressure control device for a vehicle comprising:
   a first oil pump configured to be driven by a traveling driving source for a first oil pressure supply;
   a second oil pump configured to be driven by an electric motor separate from the traveling driving source for a second oil pressure supply;
   a ratio adjusting valve provided to adjust a supply ratio of oil supplied from the first oil pump and a supply ratio of oil supplied from the second oil pump, based on an oil pressure difference between a first oil pump discharge pressure and a second oil pump discharge pressure; and
   an oil pump controller configured to perform a drive control of the second oil pump, the oil pump controller being configured to:
      set a first predetermined oil pressure value higher than a required line pressure as an equilibrium oil pressure, and set a second predetermined oil pressure value higher than the equilibrium oil pressure as a pump drive threshold, when switching from the first oil pressure supply from the first oil pump to the second oil pressure supply from the second oil pump due to a decrease in the first oil pump discharge pressure, and
      initiate an increase in the second oil pump discharge pressure by driving the second oil pump, and permit the first oil pump discharge pressure and the second oil pump discharge pressure to match at the equilibrium oil pressure, when the first oil pump discharge pressure becomes less than or equal to the pump drive threshold.

2. An oil pressure control device for a vehicle as recited in claim 1, wherein:
   the oil pump controller is configured to initiate a decrease in the second oil pump discharge pressure such that the second oil pump discharge pressure decreases to the required line pressure over time, when the first oil pump discharge pressure and the second oil pump discharge pressure have matched.

3. An oil pressure control device for a vehicle as recited in claim 1, wherein:
   the oil pump controller is configured to set a value obtained by adding a correction value for oil pressure fluctuations, occurring when the first oil pump discharge pressure and the second oil pump discharge pressure have matched, to the required line pressure as the equilibrium oil pressure.

4. An oil pressure control device for a vehicle as recited in claim 1, wherein:
   the oil pump controller is configured to set a relief pressure, at which a pressure leak valve located in a discharge oil passage of the second oil pump becomes open, as the equilibrium oil pressure.

5. An oil pressure control device for a vehicle as recited in claim 3, wherein:
   the oil pump controller is configured to maintain the second oil pump discharge pressure at the equilibrium oil pressure during a time period from a time when the second oil pump discharge pressure reaches the equilibrium oil pressure to a time when the second oil pump discharge pressure matches the first oil pump discharge pressure.

6. An oil pressure control device for a vehicle as recited in claim 1, wherein:
the oil pump controller is configured to increase the second oil pump discharge pressure during a time period from a time when an increase in the second oil pump discharge pressure is initiated to a time when the second oil pump discharge pressure matches the first oil pump discharge pressure.

7. An oil pressure control method for a vehicle having a first oil pump driven by a traveling driving source for a first oil pressure supply, a second oil pump driven by an electric motor separate from the traveling driving source for a second oil pressure supply, and a ratio adjusting valve provided to adjust a supply ratio of oil supplied from the first oil pump and a supply ratio of oil supplied from the second oil pump, based on an oil pressure difference between a first oil pump discharge pressure and a second oil pump discharge pressure, the method comprising:
setting a first predetermined oil pressure value higher than a required line pressure as an equilibrium oil pressure, and setting a second predetermined oil pressure value higher than the equilibrium oil pressure as a pump drive threshold, when switching from the first oil pressure supply from the first oil pump to the second oil pressure supply from the second oil pump due to a decrease in the first oil pump discharge pressure, and
initiating an increase in the second oil pump discharge pressure by driving the second oil pump and permitting the first oil pump discharge pressure and the second oil pump discharge pressure to match at the equilibrium oil pressure, when the first oil pump discharge pressure becomes less than or equal to the pump drive threshold.

* * * * *